United States Patent
Iwasaki

(10) Patent No.: US 9,242,376 B2
(45) Date of Patent: Jan. 26, 2016

(54) METHOD OF GENERATING PATH OF MULTIAXIAL ROBOT AND CONTROL APPARATUS FOR THE MULTIAXIAL ROBOT

(71) Applicant: DENSO WAVE INCORPORATED, Chita-gun, Aichi-pref. (JP)

(72) Inventor: Yoshirou Iwasaki, Tokai (JP)

(73) Assignee: DENSO WAVE INCORPORATED, Aichi-Pref. (JP)

(*) Notice: Subject to any disclaimer, the term of this patent is extended or adjusted under 35 U.S.C. 154(b) by 152 days.

(21) Appl. No.: 13/852,337

(22) Filed: Mar. 28, 2013

(65) Prior Publication Data

US 2014/0297030 A1 Oct. 2, 2014

(51) Int. Cl.
*G05B 19/416* (2006.01)
*B25J 9/16* (2006.01)

(52) U.S. Cl.
CPC ............. *B25J 9/1651* (2013.01); *G05B 19/416* (2013.01); *G05B 2219/39407* (2013.01); *G05B 2219/40527* (2013.01)

(58) Field of Classification Search
CPC .... B25J 9/1651; B25J 9/1664; G05B 19/416; G05B 2219/40527; G05B 2219/39407
USPC .............. 700/245–264; 318/568.18; 901/2, 9, 901/14–15, 19–20, 27–28, 30, 32
See application file for complete search history.

(56) References Cited

U.S. PATENT DOCUMENTS

| | | | |
|---|---|---|---|
| 5,294,873 A * | 3/1994 | Seraji | 318/568.1 |
| 5,811,952 A | 9/1998 | Kato et al. | |
| 6,216,058 B1 * | 4/2001 | Hosek et al. | 700/245 |
| 7,039,494 B2 | 5/2006 | Otsuki et al. | |
| 2002/0045957 A1 | 4/2002 | Otsuki et al. | |
| 2010/0318224 A1 * | 12/2010 | Okuda et al. | 700/255 |
| 2012/0029699 A1 * | 2/2012 | Jing et al. | 700/263 |

FOREIGN PATENT DOCUMENTS

| | | |
|---|---|---|
| JP | H11-053021 A | 2/1999 |
| JP | A-2000-094371 | 4/2000 |

(Continued)

OTHER PUBLICATIONS

Dec. 8, 2014 Office Action issued in German Application No. 102014104220.4.

(Continued)

*Primary Examiner* — Khoi Tran
*Assistant Examiner* — Abby Lin
(74) *Attorney, Agent, or Firm* — Oliff PLC

(57) ABSTRACT

In a multiaxial robot, a path along which the end effector of the robot moves in the shortest time duration is generated. The robot includes a first link and a second link positioned closer to an end effector than the first link. Start and end points are specified, and velocity patterns are generated for joints driving the first and second links based on the specified start end points. The velocity patterns enable a movement of the second link to cause i) a reaction for increasing an acceleration force generated by the first joint when the end effector is started to be moved from the start point toward the end point, and ii) a reaction for increasing a deceleration force generated by the first joint when the end effector is stopping to the end point.

7 Claims, 16 Drawing Sheets

(56) References Cited

FOREIGN PATENT DOCUMENTS

| | | |
|---|---|---|
| JP | A-2002-132349 | 5/2002 |
| JP | A-2002-321178 | 11/2002 |

OTHER PUBLICATIONS

Liu et al., "Time-Optimal Trajectory Generation of a Fast-Motion Planar Parallel Manipulator," Proceedings of the 2006 IEEE/RSJ International Conference on Intelligent Robots and Systems Oct. 9-15, 2006, Beijing, China, pp. 754-759.

Bobrow et al., "Time-Optimal Control of Robotic Manipulators Along Specified Paths," The International Journal of Robotics Research, vol. 4, No. 3, 1985, pp. 3-17.

James E. Bobrow, "Optimal Robot Path Planning Using the Minimum-Time Criterion," IEEE Journal of Robotics and Automation, vol. 4, No. 4, Aug. 1988, pp. 443-450.

* cited by examiner

FIG.7
(a) 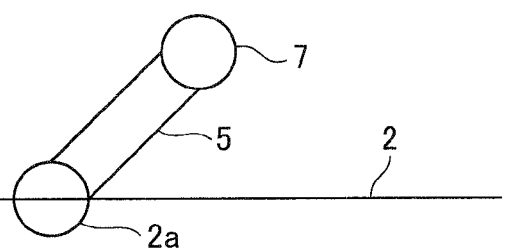
(b) 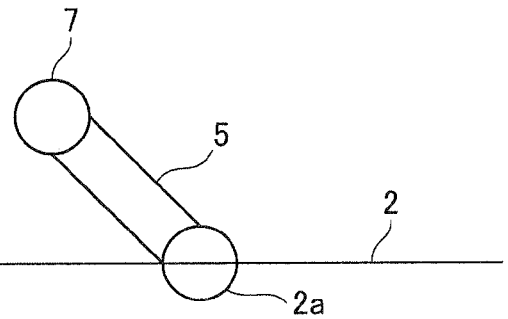

FIG.10
(a) 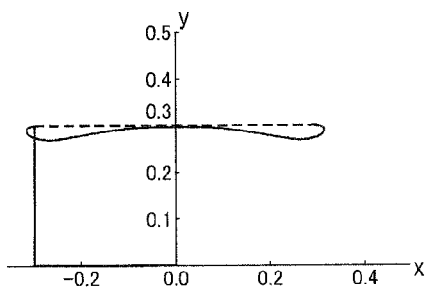
(b) 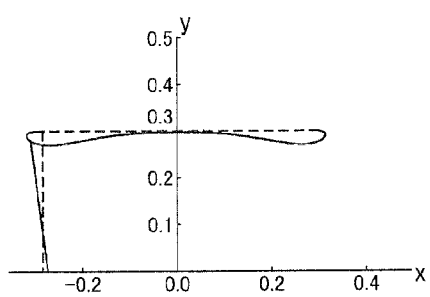
(c) 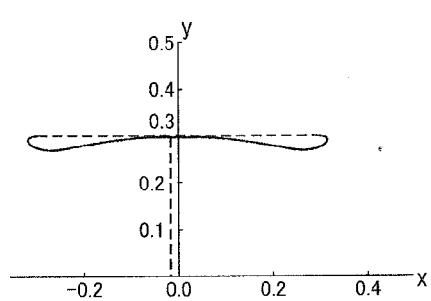
(d) 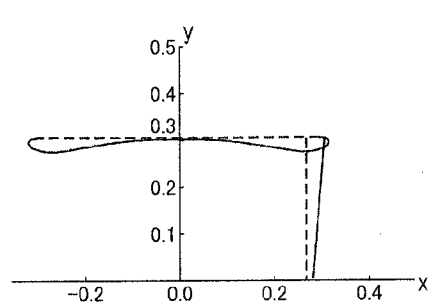
(e) 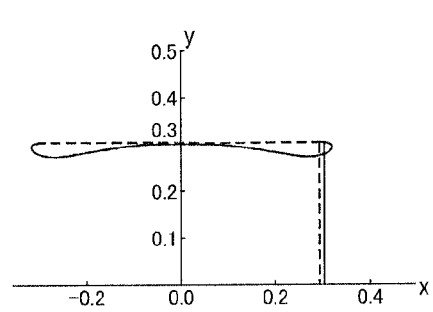

METHOD OF GENERATING PATH OF MULTIAXIAL ROBOT AND CONTROL APPARATUS FOR THE MULTIAXIAL ROBOT

BACKGROUND OF THE INVENTION

1. Technical Field of the Invention

The present invention relates to a method of generating a path to accelerate the movement velocity of a multiaxial robot and relates to a control apparatus for the multiaxial robot.

2. Related Art

Recently, in the field site such as of a productive facility, great variety of industrial robots is used. Such industrial robots include so-called multiaxial robots having a plurality of joints (axes). Such multiaxial robots are used for the works of welding, coating, parts assembly, parts conveyance, and the like. Such a multiaxial robot, by the nature of the role played by it, is required to reduce its time duration from a start point to an end point, i.e. required to increase movement velocity.

Methods of controlling the acceleration/deceleration of the movement of a multiaxial robot for increasing movement velocity are well known. For example, according to one of such methods, a basic movement velocity pattern is formed into a trapezoidal shape to calculate a maximum acceleration according to the posture of the robot, followed by correction of the velocity pattern. According to another method, a multiaxial robot is moved under bang-bang control using a maximum torque pattern which is based on a maximal principle.

In this trapezoidal velocity pattern, acceleration is constant in the time duration that corresponds to each of the shoulder portions. However, since the actual posture of the multiaxial robot changes moment by moment, the maximum acceleration changes in a non-linear manner. In other words, although a maximum acceleration can originally be achieved in a non-linear manner, the acceleration in the above movement velocity pattern is performed in a linear manner. Therefore, the motors are not able to sufficiently exert their performances. Regarding the latter method, although there are actually constraints imposed by the upper limit of the movement velocity (constraint conditions), such constraint conditions are ignored. As prior art related to the control of acceleration/deceleration mentioned above, control methods disclosed in patent documents JP-A-2000-094371, JP-A-2002-132349 and JP-A-2002-321178 are well known.

The outlines and problems of the control methods disclosed in the patent documents set forth above are explained below.

The patent document JP-A-2000-094371 discloses a control method in which the acceleration in the trapezoidal velocity pattern is changed according to the weight of a work and the inertia. However, according to this control, the acceleration is increased at a constant rate based on the acceleration calculated at the time of attaching/detaching the work. Accordingly, the acceleration cannot go beyond the limitation imposed by the attributes of the trapezoidal velocity pattern.

The control method disclosed in the patent document JP-A-2002-132349 also mentions about the time duration of performing acceleration/deceleration based on a trapezoidal velocity pattern. Specifically, in the time duration, an actual acceleration curve is adjusted so as to be in conformity, as much as possible, with a preset limiting acceleration curve to enable output of larger acceleration.

However, it is unclear in this patent document how the preset limiting acceleration curve is calculated. Further, the curve is provided, as a parameter, for each of the axes, each of the movement directions and each of accelerations/decelerations. Accordingly, in this control method: (1) a plurality of parameters are provided and thus the management is troublesome; in addition, (2) the parameters, which are discrete values, cannot precisely be in conformity with the acceleration curve; further, (3) although a maximum acceleration depends on the posture of the robot, no consideration is given to this point. Therefore, this control method is not regarded to be a generic method The patent document JP-A-2002-321178 discloses a control method in which a dynamic equation is solved taking account of the motion dynamics of each of the axes of a robot at the start point of a movement, the end point of acceleration, the start point of deceleration, and the end point of the movement to thereby minimize the acceleration time and the deceleration time. However, with this control method, acceleration/deceleration cannot be minimized at action points other than the action points mentioned above.

SUMMARY

Hence it is desired to provide a method of generating a path (or trajectory) of a multiaxial robot to further shorten the time duration in the movement of the end effector of the robot, and provide a control apparatus for the robot in a shorter time duration of the end effector thereof.

As an exemplary embodiment, there is provided a method of generating (or producing) a path of a multiaxial robot having a plurality of movable axes configured by a plurality of links and a plurality of joints, the path being used for moving an end effector arranged at an extreme end of the plurality of links from a start point to an end point, the method comprising steps of: specifying positions of the start point and the end point; and generating velocity patterns of first and second joints to drive respectively first and second joints among the plurality of joints on the basis of the specified positions of the start and end points, the second link being positioned closer to the end effector than the first link, the velocity patterns enabling a movement of the second link to cause i) a reaction for increasing an acceleration force generated by the first joint when the end effector is started to be moved from the start point toward the end point, and ii) a reaction for increasing a deceleration force generated by the first joint when the end effector is stopping to the end point.

It is desired that the velocity pattern generating step includes a step of calculating the velocity pattern, taking account of constraint conditions in actuating the first and second joints. Preferably, the constraint conditions include an acceleration condition comprised of a maximum acceleration and a maximum deceleration of each of the first and second joints, and a velocity condition comprised of a maximum velocity and a minimum velocity of each of the first and second joints.

It is also preferred that the method includes a step of setting a plurality of initial pass points between the specified start point and the end point, wherein the velocity pattern generating step generates the velocity pattern of a shortest time, while updating positions of the initial pass points. In this case, preferably, the plurality of initial pass points are three in number.

As another exemplary embodiment, there is provided a control apparatus that controls a multiaxial robot having a plurality of movable axes configured by a plurality of links and a plurality of joints, comprising: a position specifying means for specifying positions of an end effector arranged at an extreme end of the plurality of links, the positions being a start point and an end point; a velocity pattern generating means for generating (or producing) velocity patterns of first and second joints to drive respectively first and second joints among the plurality of joints on the basis of the specified positions of the start and end points, the second link being positioned closer to the end effector than the first link, the velocity patterns enabling a movement of the second link to cause i) a reaction for increasing an acceleration force generated by the first joint when the end effector is started to be moved from the start point toward the end point, and ii) a reaction for increasing a deceleration force generated by the first joint when the end effector is stopping to the end point; and a control means for controlling actuation of the first and second joints on the basis of the velocity pattern.

In the control of a conventional multiaxial robot, an axis whose amount of movement does not change between the start and end points will stay still in a simple work which is based such as on a pick-and-place pattern. When such an axis stays still, an end effector-side arm (second link) only imposes a load on a base-side arm (first link). The load on the base-side arm is so large that the load will prevent the movement velocity of the robot from being enhanced.

On the other hand, when a path is generated as described above, the end effector-side arm moves, on an end side of the base-side arm, such that a reaction is caused in the base-side arm. Accordingly, the path generated as described above can increase the acceleration required in starting the end effector and increase the deceleration required in stopping the end effector. Accordingly, the velocity of moving the end effector from the start point to the end point is increased to decrease the time duration of the robot. In this case, the following relations are established:

(Maximum joint acceleration)=(Maximum joint torque+Interference torque)/Inertia    (A)

(Maximum joint velocity)=(Maximum motor velocity)/(Reduction gear ratio)    (B)

For example, the bang-bang control only takes into account that, any one of the axes would constantly output a maximum torque but does not take account of the upper limit of the velocity. Under such control, the inertia of folding the arms is reduced on the basis of Relation (A). Accordingly, the acceleration of the robot is enhanced and thus the time duration is expected to be shortened.

However, most of the robots spread recently have a high reduction gear ratio. Accordingly, the maximum joint velocity of such a robot is low based on the Relation (B), and thus the above operation allows the joint velocity to reach its upper velocity limit in a shorter time. Therefore, the only way of shortening the time duration is to achieve a steep acceleration/deceleration.

It will be understood that, in order to enhance the acceleration/deceleration of the robot, it is effective to reduce the inertia on the basis of Relation (A) and to permit the sign of the interference-torque term to coincide with the sign of the joint torque (i.e. to permit the interference torque to assist the joint torque). In other words, in a movement of the robot, the end effector-side arm, when it is accelerated/decelerated, is permitted to pendulate in a direction opposite to the movement direction of the base-side arm.

In this case, the interfered axis of the base-side arm can obtain acceleration exceeding the maximum torque of the motor that rotates the interfered axis. Accordingly, the time duration can be shortened. Conversely, when the robot is moved in the same time duration as in the method based on conventional art, only a smaller motor torque can achieve the output of the same acceleration as in the conventional art. This can decrease the motor capacity and thus will contribute to reducing the size and cost of the robot. Further, the path described above is generated as a result of the calculation based on the motion dynamics of a multiaxial robot. Accordingly, the path calculated in this manner can maximize the velocity within a range of satisfying the constraint conditions of the robot. Thus, a practically usable path can be generated.

BRIEF DESCRIPTION OF THE DRAWINGS

In the accompanying drawings:

FIG. 7 shows, by (a) and (b), a diagram illustrating a right-hand system and a left-hand system of a robot arm;

FIG. 10 shows, by (a) to (e), a path in which coordinates of a first axis, a second axis and an end effector change on an X-Y plane;

DETAILED DESCRIPTION OF THE PREFERRED EMBODIMENTS

With reference to the accompanying drawings, hereinafter are described various embodiments of a technique of generating (or producing) a path of a multiaxial robot of the present invention and a control apparatus for the multiaxial robot.

First Embodiment

Referring to FIGS. 1 to 11, hereinafter are described a method of generating a path (or trajectory) of a multiaxial robot and a control apparatus for the multiaxial robot, according to a first embodiment of the present invention.

Figure 1:
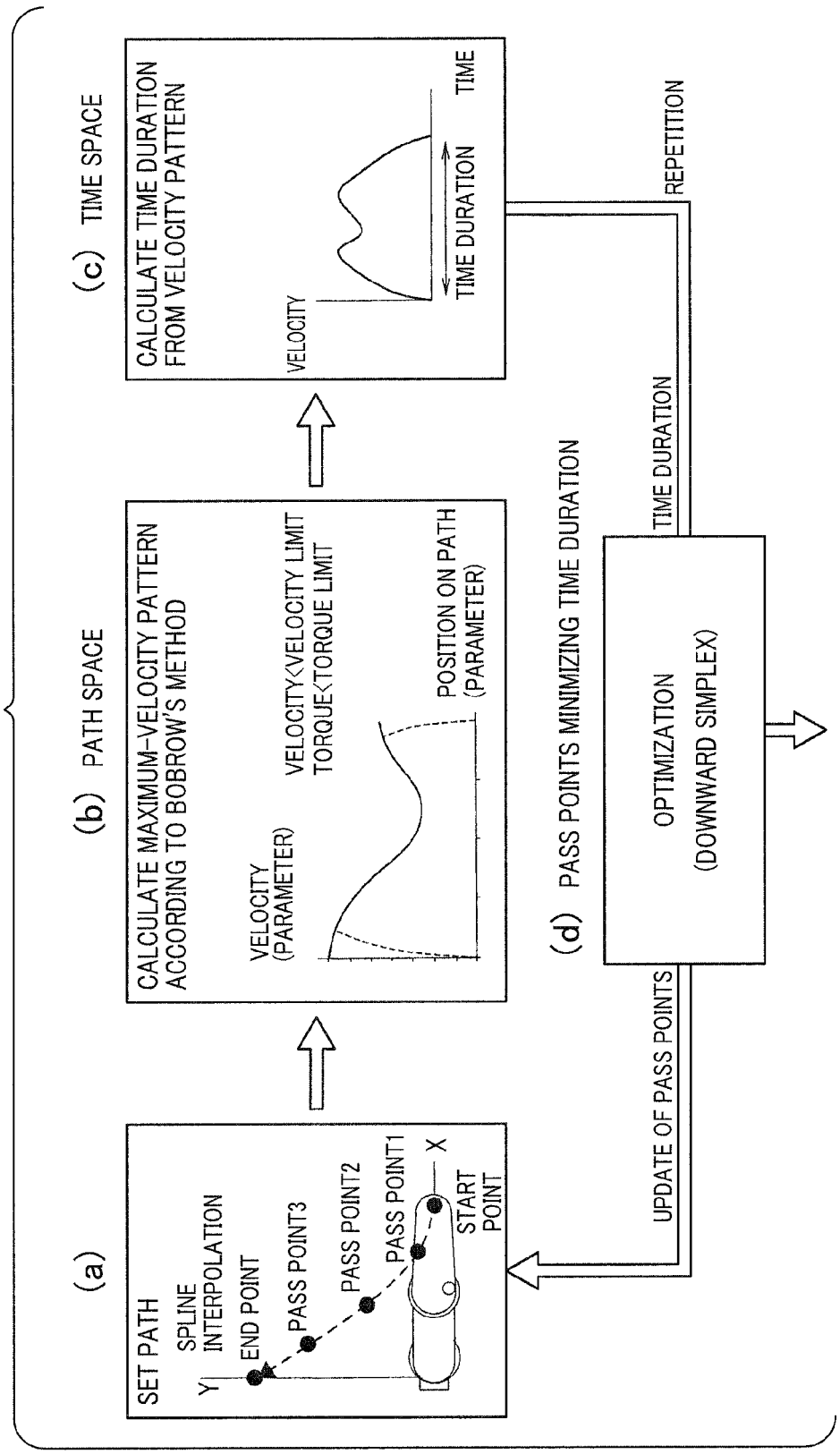
FIG. 1 shows diagrams schematically illustrating steps of calculating a movement path of minimum time for a robot, which are performed in the embodiments of the present invention.
Figure 2:
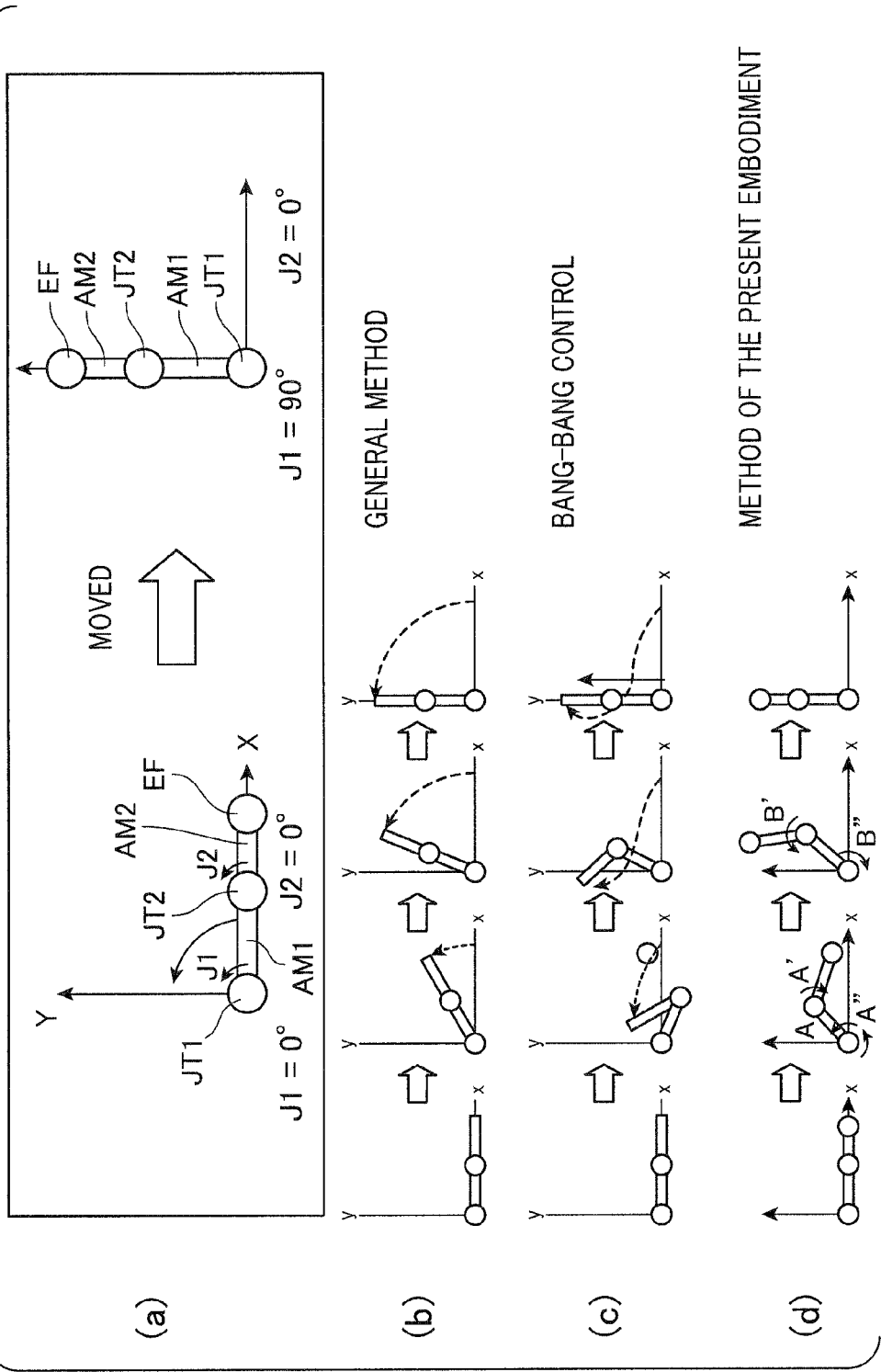
FIG. 2 shows, by (a) to (d), diagrams illustrating a principle of a method of controlling the movement of an arm of a robot according to the embodiments, comparing with an example of conventional art.
Figure 3:
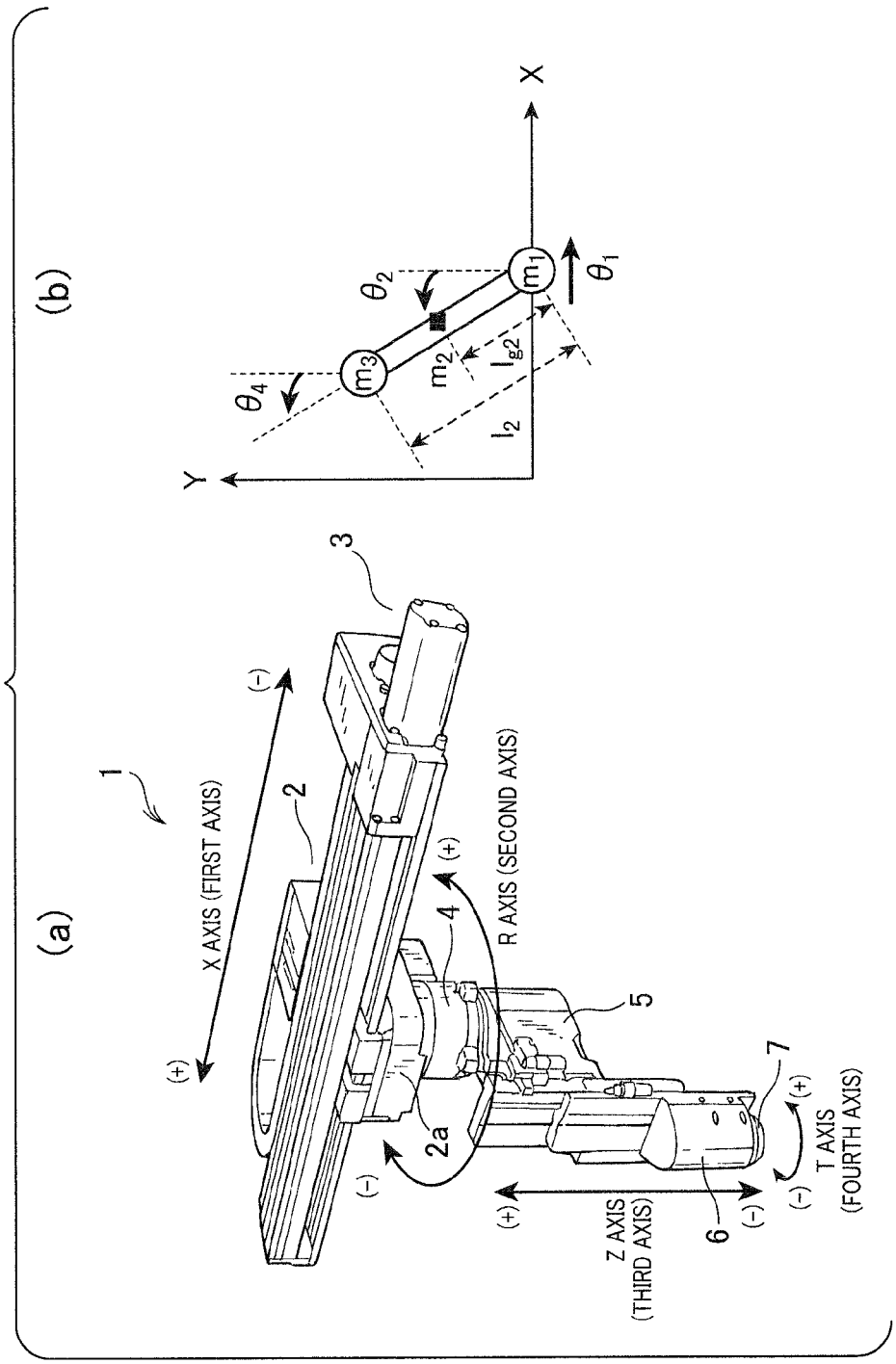
FIG. 3 shows, by (a), a general schematic perspective view of a robot exemplified in a first embodiment of the present invention and, by (b), an X-Y plane on which physical parameters (dynamic parameters) of a robot are indicated.

Before specifically describing an example of the multiaxial robot, referring to FIGS. 1 and 2, an outline of a control method of the multiaxial robot of the present embodiment is described. First, referring to (a) to (d) of FIG. 2, the control method of the present embodiment is described comparing with a control method based on conventional art.

As shown in FIG. 2(a), let us assume a simple biaxial robot (having axes J1 and J2) in which first and second arms (links) AM1 and AM2 are combined into one arm so as to be movable about two joints JT1 and JT2, respectively. An end effector EF of the robot is moved on the X-Y plane from an angular position (J1, J2)=(0°, 0°) to an angular position (J1, J2)=(90°, 0°).

As shown in FIG. 2(b), the simplest method in this case is to rotate only the first arm AM1 (i.e. the first axis J1) by 90° without moving the second arm AM2 (i.e. the second axis J2). With this method, the first arm AM1 greatly suffers from disproportionately imposed large load because only the first arm AM1 is moved. Further, with this method, the arm as a whole has a constantly maximum movement radius that causes large inertia. Therefore, this raises a problem of allowing the movement velocity to be low.

FIG. 2(c) shows a movement based on the bang-bang control mentioned above. In this case, the arm is folded involving the movement of the second arm AM2 in addition to the movement of the first arm AM1. Accordingly, the inertia is reduced to enable high-velocity movement. However, no constraint conditions, such as a velocity constraint imposed on the robot, are taken into account in this case. Therefore, it is impossible to actually move the robot in this way for the reduction of the time duration.

In the present embodiment, the movement path as schematically shown in FIG. 2(d) is realized. Specifically, when the movement of the end effector EF is started, the first arm AM1 (first axis J1) is rotated, first, in a direction of an end point (refer to the arrow A), while the second arm AM2 (second axis J2) is rotated in a direction opposite to the end point (refer to the arrow A'). In this case, the configuration of the arm is based on a so-called left-hand system.

After that, at some point of rotating the first arm AM1 (refer to the arrow A), the second arm AM2 is permitted to pendulate in its rotational direction (refer to the arrow B'), so that, as viewed with reference to the first arm AM1, the end effector EF (the position of an end of the second arm AM2) approaches the end point preceding an end of the first arm AM1. In this case, the configuration of the arm is based on a so-called right-hand system.

Specifically, in the movement shown in FIG. 2(b), the second arm AM2 and the end effector EF are always positioned on the radius of a circle centering on the first arm AM1. On the other hand, in the movement shown in FIG. 2(d), the second arm AM2 is firstly rotated in a direction of a start point (the arrow A') to allow a delay in the movement of the end effector EF. However, after that, the second arm AM2 is rotated toward the end point, preceding the first arm AM1. In other words, the end effector EF precedes the first arm AM1.

In this way, the coactive movement of the two arms AM1 and AM2 (first and second axes) can disperse the load imposed on the motors of the two joints JT1 and JT2, compared to the movement shown in FIG. 2(b). Further, since the arm is slightly folded, the inertia becomes smaller to thereby reduce the load imposed on the motors.

In addition, the movement of the second arm AM2 causes a force accompanying the reaction in the first arm AM1, i.e. the first axis J1. Specifically, when the end effector EF moves from the start point, a bias force is applied to the first arm AM1, as shown by the arrow A", accompanying the reaction against the temporarily reverse rotation (the arrow A') of the second arm AM2. The bias force A" is applied in a direction of enhancing the rotation of the arm AM1 toward the end point. Conversely, when the end effector EF approaches the end point, a suppressive force is applied to the first arm AM1, as shown by the arrow B", accompanying the reaction against the preceding movement (the arrow B') in the rotational direction of the second arm AM2 up to then. In other words, the suppressive force B" is applied in a direction of suppressing the rotation (the arrow A) of the first arm AM1 up to then.

In this way, the acceleration and the deceleration of the rotation of the first arm AM1 are positively assisted by the reaction forces, i.e. the bias force or the suppressive force, which is caused by the temporal movements of the second arm AM2 when the end effector EF starts or ends its rotation. Accordingly, the time taken for moving the end effector EF from the angular position (J1, J2)=(0°, 0°) to the angular position (J1, J2)=(90°, 0°) is remarkably shortened compared with the control without the assist described above.

In order to achieve the movement of the arms in this way, it is required to generate, in advance, a velocity pattern for rotating the arms, i.e. the motors of the respective axes. In generating the velocity pattern, a method that will be specifically described later is used to select a most efficient movement path on the premise that the constraint conditions of the robot are satisfied.

FIG. 1 illustrates diagrams schematically showing steps of realizing the movement path shown in FIG. 2(d). First, a plurality of pass points are temporarily set while the end effector EF of the robot is moved from the start point to the end point (FIG. 1(a)). Then, the Bobrow's method is used to calculate a path of the end effector EF. Thus, a velocity pattern is calculated, which can realize a maximum velocity in the movement of the end effector EF via the pass points (FIG. 1(b)). In performing the calculation according to the Bobrow's method, an equation corresponding to the actual motion of the robot (this equation is hereinafter referred to as a motion equation) is taken into account. Therefore, a maximum velocity pattern is calculated upon satisfaction of the constraint conditions of the robot, the constraint conditions including the limitation in the movement velocity and torque of each axis.

After calculating the velocity pattern, a time duration is calculated, which will be required for the robot to move from a predetermined start point to a predetermined end point according to the velocity pattern (FIG. 1(c)). Then, updating the pass points (FIG. 1(d)), the steps described above are repeatedly performed. When the time duration is determined to have been converged to minimum, the series of steps is ended. The series of steps is performed for each axis of the multiaxial robot. The resultant path will be the one that satisfies the constraint conditions of the robot (i.e. the upper limits of velocity and torque at each of the joints of the robot) and enables the end effector EF to move from the start point to the end point in a shortest time. The information regarding the velocity pattern of each axis (i.e. path information) obtained in this way is stored in a storage (not shown) in a robot controller RC (refer to FIG. 4), for use in the actual control of the multiaxial robot. The robot controller RC thus functions as a controlling apparatus for the robot.

Referring to FIGS. 3 to 11, hereinafter are specifically described a method of generating the path information of the multiaxial robot described above and an example of a control apparatus for the multiaxial robot, using the path information. FIG. 3(a) is a schematic diagram generally illustrating a four-axis robot 1 (multiaxial robot). The robot 1 includes a linear movement rail 2. The linear movement rail 2 supports, via its lower surface, a movable body 2a (base-side arm), as a first link, such that the movable body 2a can linearly move along an X direction that is the first axis (X axis). The linear movement rail 2 includes a drive mechanism that can freely move the movable body 2a. Although not specifically shown, the drive mechanism is composed of a linear movement motor 3 arranged at an end of the linear movement rail 2 and a ball-screw mechanism, not shown.

The movable body 2a has a lower surface portion which is connected with an arm support base 4. The arm support base 4 has a lower surface on which a horizontal turn arm 5 (end effector-side arm) extending in the horizontal direction is mounted. Specifically, the horizontal turn arm 5, as a second link, has an end portion on a base-end side, through which the arm 5 is mounted to the lower surface of the arm support base 4 so that the arm 5 can turn in an R direction about a second axis (vertical axis, R axis). The horizontal turn arm 5 has the other end portion (end face) on a side opposite to the base-end side with respect to the vertical axis. The end face of the arm 5 is mounted with an elevating body 6, as a third link, which is vertically movable (third axis, Z axis). The elevating body 6 has a lower surface on which a wrist 7, as a fourth link, is mounted so as to be coaxially rotatable about a vertical axis (fourth axis, T axis). The wrist 7 is configured such that a work tool, such as a chuck (hand) for holding a work, is detachably attached thereto.

The horizontal turn arm 5 is infinitely rotatable (turnable) in a horizontal direction by an arm rotating motor 8 (see FIG. 4) and a rotation transmission mechanism. The arm rotating motor 8 is arranged inside the arm support base 4 to serve as a drive source. The elevating body 6 is vertically moved at an end of the horizontal turn arm 5 by a motor and a rack-pinion mechanism incorporated in the horizontal turn arm 5. The wrist 7 is coaxially rotated by a motor incorporated in the elevating body 6.

Figure 4:
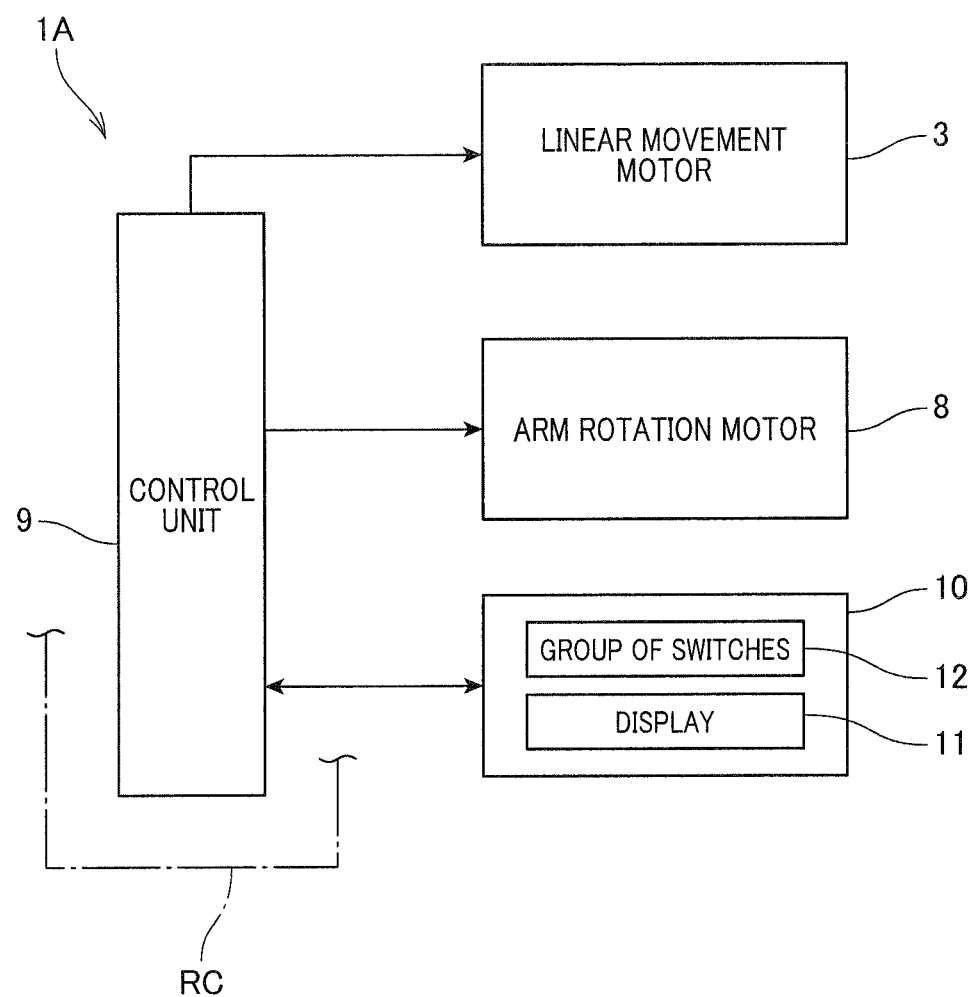
FIG. 4 shows an electrical and functional block diagram illustrating a control system of the robot according to the first embodiment.

The movements of the robot 1 (motors of the respective axes, including the linear movement motor 3) are ensured to be controlled, as shown in FIG. 4, by a control unit 9 (control apparatus) of a robot controller RC on the basis such as of a work process program. The control unit 9 includes a CPU, ROM and RAM and connected with a teaching pendant 10. The teaching pendant 10 includes a group of switches 11 and a display 12 as an indicating means.

FIG. 3(b) illustrates an X-Y plane on which physical parameters (dynamic parameters) of the robot 1 are indicated. The Y axis is orthogonal to the X axis. The front side of the robot 1 shown in FIG. 3(a) corresponds to the positive side of the coordinate. In FIG. 3(b), references $m_1$, $m_2$ and $m_3$ indicate a mass of the first link [kg], a mass of the second link [kg] and a total mass [kg] of "the third and fourth links and the loads", respectively. References $l_{g2}$ indicates a distance [m] from the axis position of the first link to the gravity center of the second link. Reference $l_2$ indicates a length [m] of the second link. Reference $I_2$ indicates an inertia [kgm$^2$] around the gravity center of the second link. Reference $I_4$ indicates an inertia [kgm$^2$] around the third and fourth links and a total gravity center. Reference $\theta 1$ indicates a joint position of the first axis, and reference $\theta 2$ indicates a joint angle of the second axis.

The multiaxial robot 1 described above has four axes. The method of generating a path and the control method according to the present embodiment can be performed with respect to a plurality of axes, i.e. two or three axes or more, among the four axes. However, for the sake of clarifying the description on the principal of path generation and control, only the first and second axes are subjected to calculation in the following description. On the basis of the description set forth below, an example of path generation involving three or more axes and control will be described later.

Here, regarding quantities $\theta$ and $\lambda$, the following definitions are given:

$\theta$: Position of a robot shown by a joint angle of each axial joint [rad], $\theta'$: Velocity of a robot shown by an angular velocity of each axial joint [rad/s]:

$\theta''$: Acceleration of a robot shown by an angular acceleration of each axial joint [rad/s$^2$]:

$\lambda$: Each position on a path, which is referred to as a path parameter:

$\lambda'$: Gradient at each position on a path, which is referred to as a path velocity: and $\lambda''$: Curvature at each position on a path, which is preferred to as a path acceleration.

The motion equation of the multiaxial robot 1 described above is generally expressed by the following Formula (1):

$$\tau = H(q)\ddot{q} + h(q, \dot{q}) + B\dot{q} + g(q) \tag{1}$$

$$q = \begin{bmatrix} \theta_1 \\ \theta_2 \end{bmatrix}, \dot{q} = \begin{bmatrix} \dot{\theta}_1 \\ \dot{\theta}_2 \end{bmatrix}, \ddot{q} = \begin{bmatrix} \ddot{\theta}_1 \\ \ddot{\theta}_2 \end{bmatrix}$$

where $\tau$ represents a torque vector. The physical parameters of the robot 1 are reflected to an inertia matrix H and a matrix h indicating the centrifugal and Coriolis forces, in Formula (1).

$$H = \begin{pmatrix} m_1 + m_2 & -\cos[\theta_2(t)]m_2 l_{g2} \\ -\cos[\theta_2(t)]m_2 l_{g2} & i_2 + m_2 l_{g2}^2 \end{pmatrix} \tag{2}$$

$$h = \begin{pmatrix} \sin[\theta_2(t)]m_2 l_{g2} \theta_{2'}(t)^2 \\ 0 \end{pmatrix}$$

Further, in Formula (1), B represents a friction and g represents a gravity. However, these are ignored in the following description.

Figure 5:
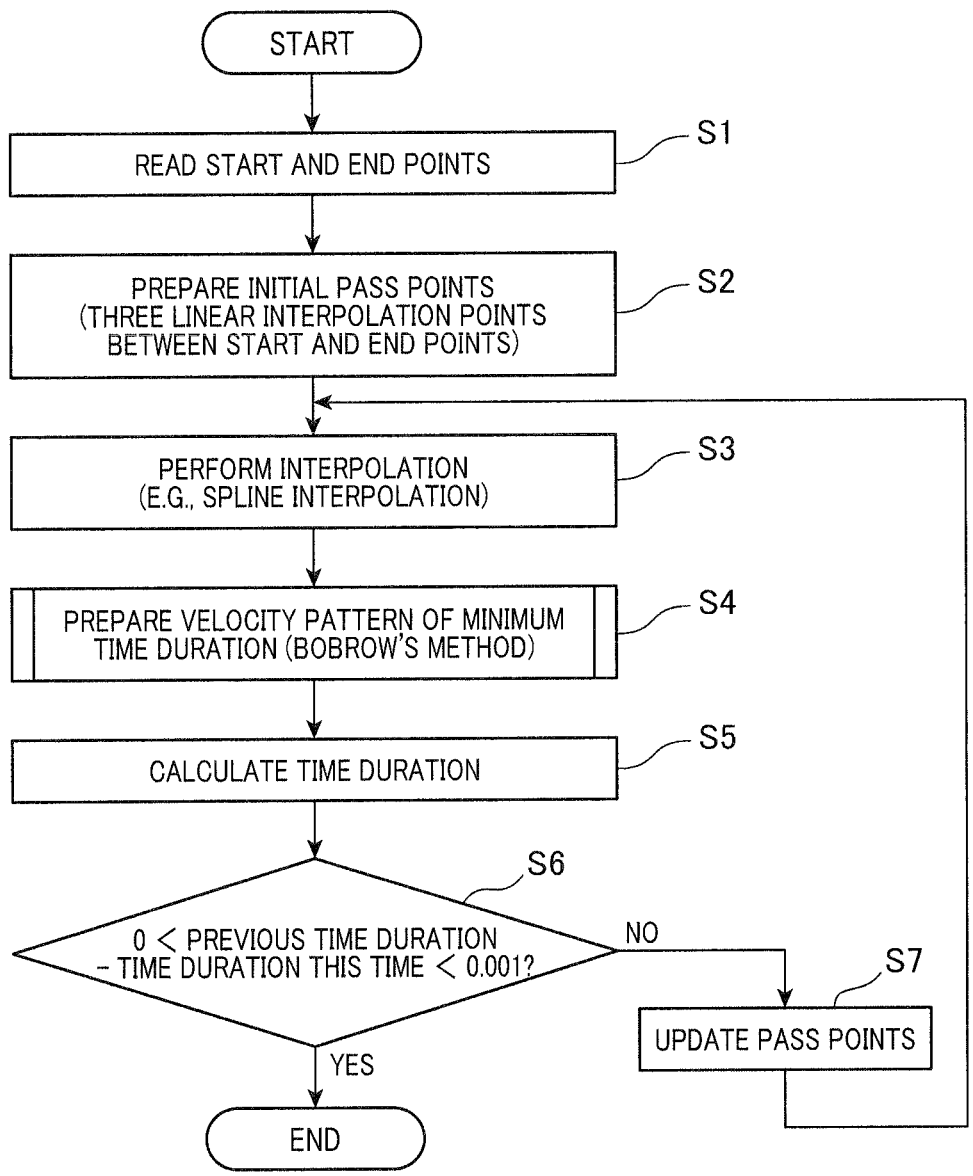
FIG. 5 shows a flow diagram illustrating steps of generating a velocity pattern performed by a control unit, according to the steps shown in FIG. 1.

Regarding the details of the motion equation of a robot, refer to the following Document 1:

Document 1: *Proceedings of the* 2006 *IEEE/RSJ International Conference on Intelligent Robots and Systems* Oct. 9-15, 2006, Beijing China "*Time-Optimal Path Generation of Fast-Motion Planar Parallel Manipulator*" by Yanjie Liu, Chenqi Wan, Juan Li, Lining Sun FIG. 5 is a flow diagram illustrating the steps corresponding to those which are illustrated in FIG. 1, performed by the control unit 9.

First, the control unit 9 reads a start point and an end point of the end effector of the robot 1 (step S1). For example, the start and end points are given, for example, as teaching points by the operator. Then, responsively to an operator's command or automatically, the control unit 9 determines three points between the start and end points, for use as initial pass points (interpolating points) (step S2). In determining these initial pass points, linear interpolation or the like is used. For example, when the coordinate of the start point is (0, 0) and the coordinate of the end point is (30, 100), the initial pass points are determined to be (7.5, 25), (15, 50) and (22.5, 75).

Then, the control unit 9 performs a spline interpolation, for example, to interpolate between the start point, the end point and the three initial pass points (step S3). With respect to the path resulting from the spline interpolation, the control unit 9 prepares a velocity pattern that minimizes the time duration, using the Bobrow's method (step S4).

Regarding the Bobrow's method, refer to the following Documents 2 and 3.

Document 2: *The International Journal of Robotics Research*, Vol. 4. No. 3, Fall 1985 pp. 3-17 *"Time-Optimal Control of Robotic Manipulators Along Specified Paths"* by J. E. Bobrow, S. Dubowsky, J. S. Gibson Document 3: *IEEE JOURNAL OF ROBOTICS AND AUTOMATION*, Vol. 4, No. 4, August 1988 pp. 443-450 *"Optimal Robot Path Planning Using the Minimum-Time Criterion"* by James E. Bobrow Then, the control unit 9 calculates a time duration in the case where the end effector (the end of the second axis, i.e. the second arm in the present example) of the robot 1 is moved along the interpolated path, according to the prepared velocity pattern (step S5). Then, the control unit 9 calculates the difference between the time duration with the time duration calculated previously. Then, the control unit 9 determines whether or not the difference between the two time durations is smaller than a predetermined threshold (e.g., 0.001 s) (step S6). If a negative determination is made (NO at step S6), the pass points calculated at step S2 are updated using a downward simplex method or the like (step S7). As a matter of course, other method, e.g., gradient method or genetic algorithm, may be used here.

After updating the pass points, the process of the control unit 9 returns to step S3, and step S3 and the subsequent steps up to step S7 are repeatedly performed. Then, if the difference in the time duration between this time and the previous time is less than the predetermined threshold (YES at step S6), the series of steps of calculating a movement path is ended.

Figure 6:
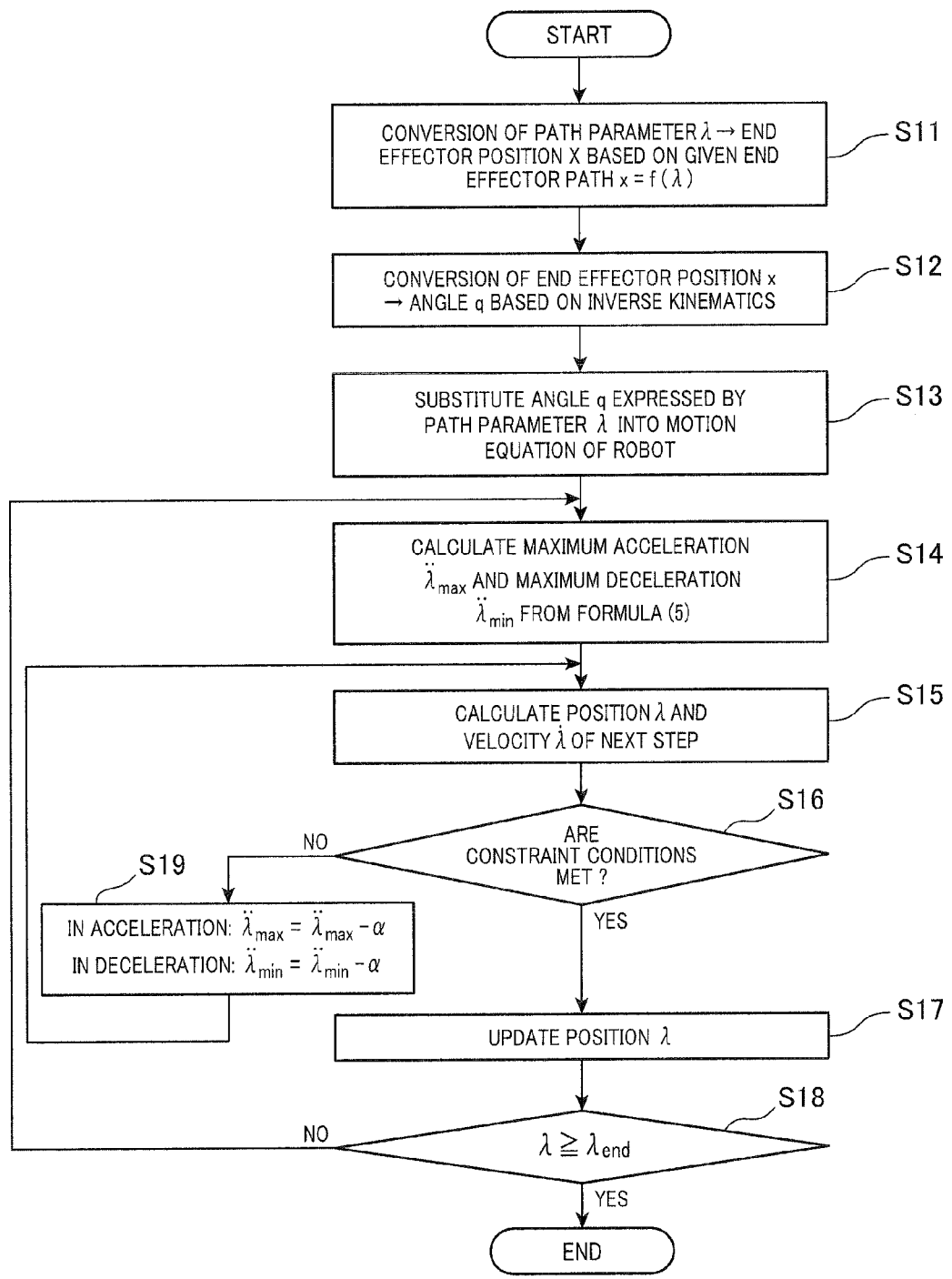
FIG. 6 shows a flow diagram illustrating details of a part of the steps of generating the velocity pattern as shown in FIG. 5, using the Bobrow's method and taking account of constraint conditions.

Referring now to FIG. 6, hereinafter is described the calculation according to the Bobrow's method carried out at step S5. First, using the following Formula (3) expressing the path of the end effector, which has been determined at step S3, a path parameter $\lambda$ is converted to an end effector position x (vector) on the path (step S11).

$$x = f(\lambda) \quad (3)$$

It should be appreciated that the numbers designated to the formulas are in conformity with those which, if any, are indicated in Document 1. When the path $f(\lambda)$ is interpolated with a three-dimensional spline function, for example, the following Formula (3a) is established:

$$f(\lambda) = a\lambda^3 + b\lambda^2 + c\lambda + d \quad (3a)$$

where $\lambda$ represents a variable of the coordinates which depends on increments in the path from the start point to the end point.

Then, based on inverse kinematics, the end effector position x is converted to an angle q of each axis (arm) (step S12).

$$q = p^{-1}(f(\lambda)) \quad (4)$$

where p represents a function that indicates forward kinematics. The reason why the end effector position x is converted to an angle q is that a path of the end effector can be calculated without limiting the hand system, i.e. the configuration of the arm of the robot 1 (FIG. 7(*a*) shows a left-hand system and FIG. 7(*b*) shows a right-hand system).

Figure 8:
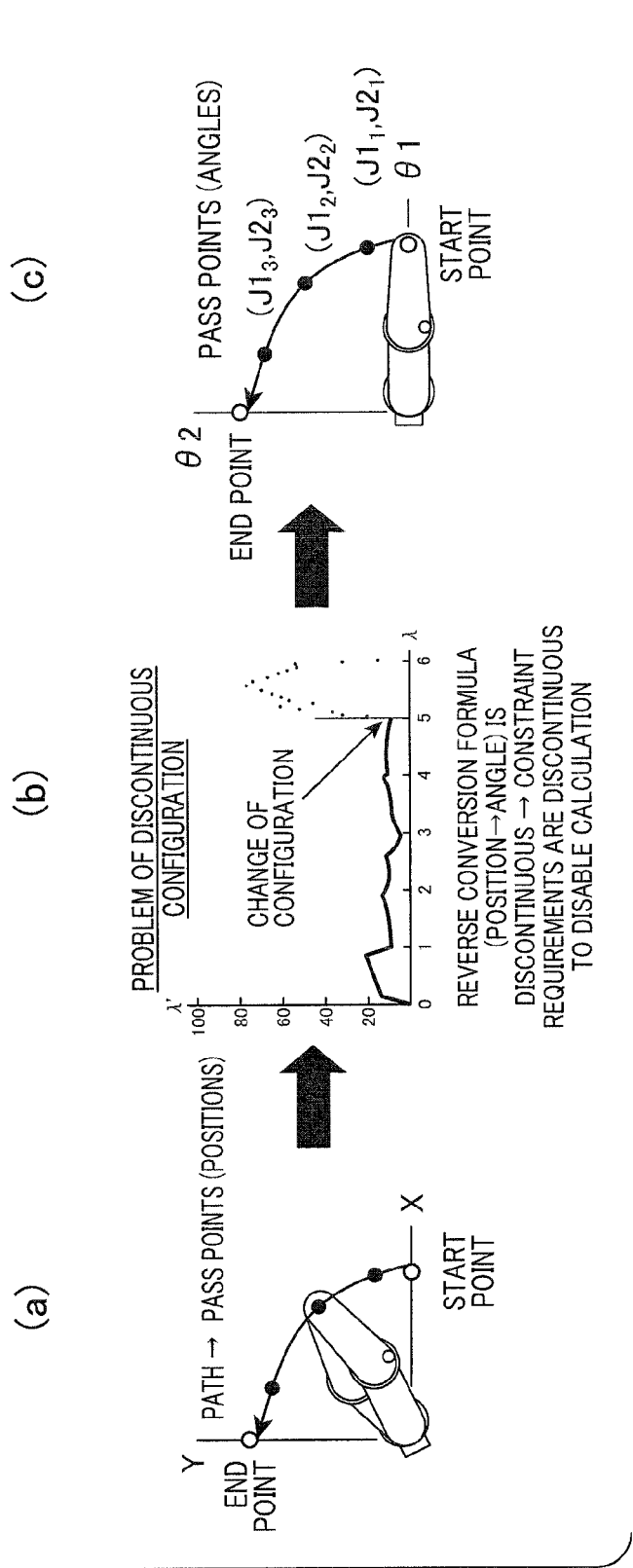
FIG. 8 shows a diagram illustrating the reasons why a velocity pattern is calculated by converting coordinate positions of an end effector to an angle of each axis.

Specifically, as will be described referring to FIG. 8, when the calculation of FIG. 6 is performed using the coordinate positions, assuming that the configuration of the arm is changed at some point of the path (see (a) and (b) of FIG. 8), the constraint conditions will be discontinuous at the point when the configuration is changed and thus no results of the calculation will be obtained. Therefore, the calculation using the coordinate positions is required to be performed without changing the configuration of the arm. (In Documents 2 and 3 as well, a velocity pattern that can achieve a maximum velocity is calculated without changing the configuration of the arm of the robot from the initially determined configuration.)

In contrast, in the present embodiment, a movement path is calculated by converting, in advance, the coordinate positions into the angles of the individual axes. Accordingly, in the event the configuration of the arm is changed at some point of the path, the constraint conditions will not be discontinuous and thus the results of the calculation can be obtained. In this way, a velocity pattern that can achieve a maximum velocity is calculated without being constrained by the configuration of the arm.

Thus, when Formula (4) is substituted into Formula (1), Formula (5) is obtained as follows (step S13):

$$\tau = a_1(\lambda)\ddot{\lambda} + a_2(\lambda)\dot{\lambda}^2 + a_3(\lambda)\dot{\lambda} + a_4(\lambda)$$

$$a_1 = HJ^{-1}f'$$

$$a_2 = HJ^{-1}(f'' - \dot{J}(q, J^{-1}f')J^{-1}f') + h(q, J^{-1}f')$$

$$a_3 = BJ^{-1}f'$$

$$a_4 = g \quad (5)$$

where J represents Jacobian. Further, in Formula (5), the terms of $a_3$ and $a_4$, i.e. the parameters including the friction B and the gravity g, equal to zero.

Then, at step S14, the control unit 9 calculates a maximum acceleration $\lambda''_{max}$ and a maximum deceleration $\lambda''_{min}$ from Formula (5) (regarding this, refer to Formulas (8) to (10) of Document 1). The symbol " suffixed to $\lambda$ replaces the double dots that indicate acceleration in Document 1. The maximum acceleration $\lambda''_{max}$ and the maximum deceleration $\lambda''_{min}$ calculated here are the constraint conditions associated with the acceleration in the movement of the robot 1.

Then, the control unit 9 calculates a next position $\lambda$ and a velocity $\lambda'$ from Formulas (11) and (12), using the maximum acceleration $\lambda''_{max}$ (or the maximum deceleration $\lambda''_{min}$) (step S15). In these formulas, time t is a sampling time (e.g., 1 ms). Further, symbols $\lambda_0$ and $\lambda'_0$ indicate a current position and velocity, respectively. The symbol ' suffixed to $\lambda$ indicates a first-order differentiation and replaces the dot that indicates velocity in Document 1.

$$\lambda = 0.5\lambda''_{max}t^2 + \lambda'_0 t \quad (11)$$

$$\lambda' = \lambda''_{max}t \quad (12)$$

Then, the control unit 9 determines whether or not the velocity λ' and the acceleration (deceleration) λ" of the path parameter λ satisfy the constraint conditions (step S16). Specifically, the control unit 9 determines whether or not both of the following conditions:

$$\lambda'_{min} \leq \lambda' \leq \lambda'_{max} \quad (13)$$

$$\lambda''_{min}(\lambda,\lambda') \leq \lambda'' \leq \lambda''_{max}(\lambda,\lambda') \quad (14)$$

are concurrently satisfied. Depending on whether the robot is in acceleration or deceleration, $\lambda'_{min}$ or $\lambda'_{max}$ and $\lambda''_{min}$ or $\lambda''_{max}$ is used.

Figure 9:
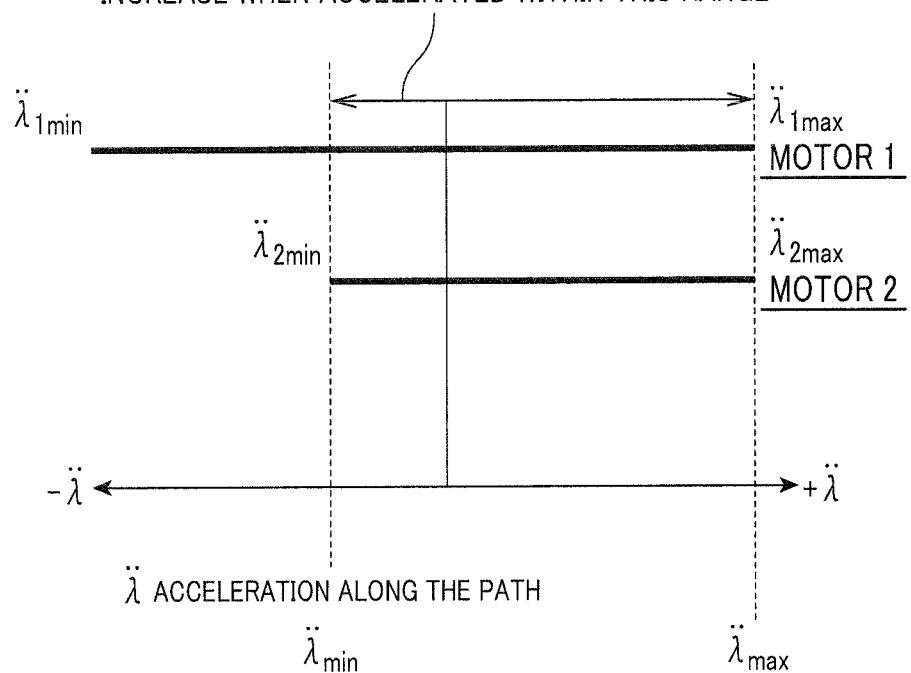
FIG. 9 shows an explanatory diagram illustrating the constraint condition of path acceleration.

FIG. 9 is a schematic diagram based on FIG. 2 of Document (2) set forth above. Specifically, FIG. 9 shows a range of satisfying the constraint conditions regarding the acceleration (deceleration) λ" of the path parameter λ of a biaxial robot. More specifically, an allowable range $\lambda''_{min}$ to $\lambda''_{max}$ is set under AND conditions within a range of a maximum acceleration to a maximum deceleration specified to each axis (motor arranged at each joint).

Further, critical values $\lambda'_{min}$ and $\lambda'_{max}$ of the constraint conditions regarding the velocity λ' of the path parameter λ are as follows:

$$\lambda'_{min} = \max(q'_{min}/f(\lambda)) \quad (15)$$

$$\lambda'_{max} = \min(q'_{max}/f(\lambda)) \quad (16)$$

where f(λ) indicates a path, and $q'_{min}$ and $q'_{max}$ indicate minimum and maximum joint velocities, respectively, determined depending on the specification of the robot 1.

The velocity condition and the acceleration (torque) condition are minimum conditions necessary as the constraint conditions. Depending on the situation, other conditions may be added.

At step S16 mentioned above, if the velocity λ' and the acceleration (deceleration) λ" of the path parameter λ satisfy both of the constraint conditions of Formulas (13) and (14) (YES at step S16), the control unit 9 updates the position λ to the value calculated at step S15 (step S17). Then, the control unit 9 determines whether or not the position λ has reached an end $\lambda_{end}$ (step S18). If a negative determination is made (NO at step S18), the process returns to step S14. If an affirmative determination is made (YES at step S18), the process is ended.

On the other hand, at step S16, if the velocity λ' and the acceleration (deceleration) λ" do not satisfy at least one of the constraint conditions of Formulas (13) and (14) (NO at step S16), the control unit 9 performs step S19. Specifically, when the robot is in a state of acceleration, the control unit 9 subtracts an arbitrary constant "a" from the maximum acceleration $\lambda''_{max}$ to use the resultant value as a new maximum acceleration $\lambda''_{max}$. On the other hand, when the robot is in a state of deceleration, the control unit 9 subtracts the arbitrary constant "a" from the maximum deceleration $\lambda''_{min}$ to use the resultant value as a new maximum deceleration $\lambda''_{min}$. After that, the process returns to step S15 where the position λ and the velocity λ', i.e. the path parameters, are recalculated.

When the process shown in FIG. 6 is completed, a velocity pattern that can achieve a maximum movement velocity is obtained. With this velocity pattern, a maximum movement velocity is achieved when the end effector of the robot 1 moves along the path obtained through the interpolation at step S3 of FIG. 5, satisfying the constraint conditions of the velocity and acceleration (=torque). In other words, since the calculation process according to the Bobrow's method is performed based on the motion dynamics of the robot 1, the constraint conditions of the robot 1 can be satisfied.

Although not shown, actually, the time duration according to steps S4 and S5 is calculated for forward and backward velocity patterns between the start and end points. That is, the algorithm set forth in step S4 is applied to calculation of the forward velocity pattern from the start point to the end point, and then applied to calculation of the backward velocity pattern from the end point to the start point. After that, the forward velocity pattern and the backward velocity pattern are combined, and a time duration is calculated for the combined pattern.

Figure 11:
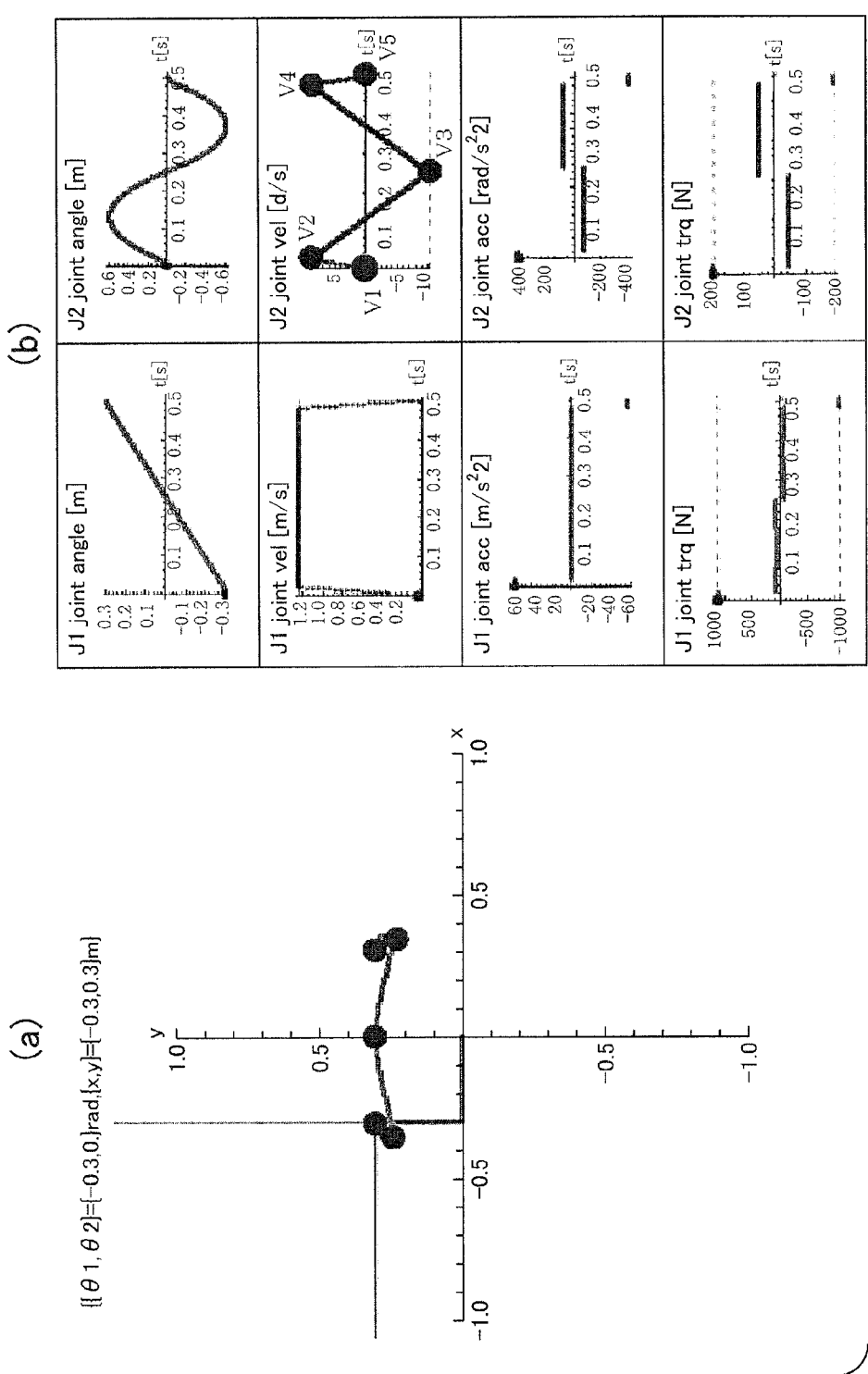
FIG. 11 shows, by (a), a diagram concurrently plotting the five positions of the end effector, which are shown by (a) to (e) of FIG. 10 and, FIG. 11 shows, by (b), a diagram illustrating changes in an angle, angular velocity, angular acceleration and torque of each of the first and second axes during a movement from a start point to an end point.

FIGS. 10 and 11 show an example of a path calculated as described above for the minimization of the movement velocity of the end effector of the robot 1. FIG. 10(a) is a diagram illustrating, with the solid line, a path, i.e. changes in coordinates, on the X-Y plane, of the first and second axes and the end effector. As shown in the figure, the coordinate at the start point is (−0.3, 0.3) and the coordinate at the end point is (0.3, 0.3). FIG. 11(b) is a diagram illustrating changes in the angle, angular velocity, angular acceleration and torque of the first and second axes during the movement from the start point to the end point.

The first axis linearly moves on the X axis from −0.3 [m] (see FIG. 10(a)) to 0.3 [m] (see FIG. 10(e)). This corresponds to the movement of the movable body 2a along the linear movement rail 2. The second axis has a rotation angle θ2 (rotation angle of the horizontal turn arm 5) which is 0 [rad] at the start and end points and at a midpoint on the X axis. However, as shown in FIG. 10(b), the second axis is in a state of being rotated, by 0.6 [rad], in a direction opposite to the direction of the end point. Thus, the X-axis coordinate of the end effector is on a negative side with respect to the coordinate of the movable body 2a. This state corresponds to the right-hand system in light of the configuration of the arm of the robot 1. In contrast, as shown in FIG. 10(d), the second axis is in a state of being rotated, by −0.6 [rad], in the direction of the start point. Thus, the X-axis of the position of the end effector is on a positive side with respect to the coordinate of the movable body 2a. This state corresponds to the left-hand system in light of the configuration of the arm of the robot 1.

In accordance with the above movement, the angular velocity of the second axis reaches a positive-side peak (10 rad/s, peak V2) right after moving away from the start point (V1). Then, from this peak point, the angular velocity linearly changes toward a negative-side peak (−10 rad/s, peak V3) at a midpoint. Further, the angular velocity also linearly changes from the midpoint toward a positive-side peak (10 rad/s, peak V4) right before the end point. In other words, as shown in FIG. 11(b), a symmetrical velocity pattern is drawn centering on the midpoint.

The angular acceleration corresponding to the above angular velocity pattern will have a pattern as follows. Specifically, the angular acceleration reaches a positive-side peak 400 rad/s² from 0 at the start point V1, turns to a negative value of about −50 rad/s² at the peak V2 and keeps the negative value of about −50 rad/s² up to the peak V3 at the midpoint. Further, when the angular acceleration turns to a positive value of 50 rad/s² at the peak V3 at the midpoint, the value is kept up to the peak V4. Then, the angular acceleration reaches a negative-side peak −400 rad/s² at the peak V4 and returns to 0 at the end point V5.

The movement of the second axis as described above exerts the following effects. Specifically, upon start of the movement from the start point, the second axis changes its angle θ2 from 0 [rad]→0.6 [rad]→0 [rad] before it reaches the midpoint on the X axis. Thus, the end effector of the robot 1, which has once pendulated in a positive-rotation direction, pendulates back in a negative-rotation direction. In response, a reaction accompanying this movement is caused in the movable body 2a to generate an acceleration force for accelerating the movement of the first arm when movement is started. This bias force assists (biases) the movement of the first and second arms in the direction of the end point.

On the other hand, the second axis changes its angle θ2 from 0 [rad]→−0.6 [rad]→0 [rad] before it reaches the end point from the midpoint on the X axis. Thus, the end effector of the robot 1, which has once pendulated in a negative-rotation direction, pendulates back in a positive-rotation direction. In this case as well, a reaction accompanying the movement is caused in the movable body 2a to work as a deceleration force. The deceleration force assists (suppresses) the deceleration movement of the second axis before it reaches the end point and stops its movement.

As a result of the movement of the second axis as described above, time is shortened for the end effector of the robot 1 to move from the start point to the end point, compared with the time required for the simple movement of a multiaxial robot based on the conventional art. The broken lines in FIG. 10 indicate a path in the case where the first axis is moved without rotating the second axis at all. When the movement of the robot 1 was simulated based on this broken-line path, the time duration was 536 ms, while a simulation based on the path indicated by the solid line resulted in a time duration of 514 ms. Thus, the solid-line path had an effect of reducing the time duration by 4% or more. Accordingly, when the robot 1 is allowed to have a time duration equal to that of the conventional art, the robot 1 can be moved with less energy than in the conventional art, thereby contributing to energy saving. Further, for example, reducing the output of the motors, the level of wattage of the motors can be reduced, leading to reduction in the size and cost of the robot 1.

FIG. 11(a) is a diagram concurrently plotting the five positions of the end effector illustrated in (a) to (e) of FIG. 10. These five positions correspond to the five points (V1 to V5) plotted on the angular velocity pattern of the second axis shown in FIG. 11(b), i.e. correspond to reverse points of the angular velocity or the angular acceleration. As described above, at step S2 of FIG. 5, three initial pass points are set between the start and end points. These three initial pass points are selected so as to correspond to the reverse points of the angular velocity or the angular acceleration shown in FIG. 11. This is because selection of the three initial pass points in this manner is regarded to be advantageous in enhancing the efficiency of calculation.

For example, as will be understood from FIG. 4 of Document 3 and the related description therein, in the Bobrow's method, a larger number of pass points for searching a path can exert more effect of reducing the time duration. However, increase in the number of pass points directly leads to the increase of the time taken for calculation. Therefore, unlimited increase of the number of pass points is not practical.

In this regard, in the present embodiment, the number of the initial pass points is set to three, taking account of the balance between reduction of the time duration and suppression in the increase of the calculation time. Selection of the initial pass points is not required to be strictly performed. As described above, the three initial points may be determined such as by simply dividing the linear distance between the start and end points into four. In the course of repeating the steps shown in FIG. 1 or 5, a new path is calculated with the update of the pass points to achieve optimization.

As a result, a path will be selected, which would minimize the time duration in a movement pattern such as a pick-and-place pattern. The selection of such a path depends on the coordinate positions of the three pass points as the three reverse points, as shown in FIG. 11(a), of the angular velocity or the angular acceleration of the second axis. In this way, when the number of the initial pass points is set to three, a path that minimizes the time duration can be calculated, while suppressing increase in the calculation time.

As described above, according to the present embodiment, the object to be moved is the multiaxial robot 1 that includes the movable body 2a positioned on the base side and the horizontal turn arm 5 connected thereto on the end-effector side of the movable body 2a. The control unit 9 generates a path such that, in moving the end effector from the start point, the reaction caused in the movable body 2a by the movement of the horizontal turn arm 5 can increase the acceleration force, which is caused by the movement of the movable body 2a along its base axis that is the linear movement rail 2. Also, the control unit 9 generates the path such that, in stopping the end effector at the end point, the reaction caused in the movable body 2a by the movement of the horizontal turn arm 5 can increase the deceleration force caused by the movement of the movable body 2a.

In the control of a multiaxial robot based on conventional art, an axis whose amount of movement does not change between the start and end points stays still in a simple work based on a pick-and-place pattern or the like. In other words, the robot will have the movement pattern indicated by the broken lines in FIG. 10. With the arm being fully extended, the second axis would continue outputting useless holding torque so that the arm on the end effector-side would not be moved by the inertia torque caused by the high acceleration of the first axis (travelling axis). Accordingly, the useless holding torque only imposes a load on the base-side arm.

On the other hand, when a path is generated as described above, the horizontal turn arm 5 moves such that it causes a reaction to the movable body 2a. The path can increase both the acceleration force required in activating the end effector and the deceleration force required in stopping the end effector. Thus, the velocity of moving the end effector from the start point to the end point is enhanced to thereby reduce the time duration of the end effector. Specifically, at some point of the movement of the end effector, the horizontal turn arm 5 is slightly rotated to reduce the inertia caused in the linear movement of the movable body 2a. Accordingly, the end effector can be moved with less energy. Therefore, when the robot 1 is moved in a time duration equal to that of a path based on a conventional method, the robot 1 can be moved consuming less energy than in the conventional art.

The path described above is generated as a result of the calculation based on the motion dynamics of the multiaxial robot 1. Accordingly, a path calculated in this manner can maximize the movement velocity within a range of satisfying the constraint conditions of the robot. Thus, an optimized path for practical use can be generated. In addition, in calculating a velocity pattern using the Bobrow's method, positions on the path are converted to angles. Accordingly, the configuration of the arm of the robot 1 is not limited to either of the left-hand system and the right-hand system. Thus, a velocity pattern that can achieve a maximum velocity is calculated using both of the left- and right-hand systems.

Further, when the end effector is moved from the start point, the movable body 2a is moved in the direction of the end point, while the horizontal turn arm 5 is rotated so that an end thereof moves in a direction opposite to the direction of the end point. After that, the end of the horizontal turn arm 5 is rotated in the direction of the end point. In this case, the reaction caused by the movement of the horizontal turn arm 5 comes to assist the acceleration force at the time of activating the robot 1.

Furthermore, the path is generated such that, in stopping the end effector at the end point, the horizontal turn arm 5 at a position where the end thereof, or the end effector, goes beyond the end point is moved therefrom toward the start point. In other words, the path is generated so that the end of the horizontal turn arm 5, or the end effector, is permitted to pendulate back toward the start point and stopped. In this case, the reaction caused by the movement of the horizontal turn arm 5 comes to assist the deceleration force at the time of stopping the robot 1. In other words, the path generated in this way allows the horizontal turn arm 5 to move such that it causes a reaction to the movable body 2a.

Three pass points are set between the start and end points and a time duration suitable for the pass points is ensured to be calculated, while the positions of the three pass points are changed. Specifically, in order to generate a path that minimizes the time duration of the end effector, the path is required to be optimized. In order to optimize the path, one or more pass points are required to be set between the start and end points, and the movement velocity calculated when the positions of the pass points are changed is required to be compared with the movement velocity before the change.

Assuming that the horizontal turn arm 5 is moved as described above, the movable body 2a that is an axis on the base side with respect to the horizontal turn arm 5 will have: a time point when an acceleration is given thereto right after the activation; a time point when the direction of the acceleration is reversed at some point of the movement; and a time point when the acceleration is rendered to be zero right before the stop. In the course of optimizing the path, it is considered to be important to optimize at least the pass points corresponding to the above three time points. Accordingly, when the pass points corresponding to the above three time points are set, a path that minimizes the time duration is efficiently generated while the amount of calculation is suppressed. In this way, an optimized and practically usable path can be obtained. At the same time, with such a path, the potential of the motors or the actuators can be maximally drawn out, which would not have been achieved by the method based on conventional art due to the limitation of the method.

Second Embodiment

Figure 12:
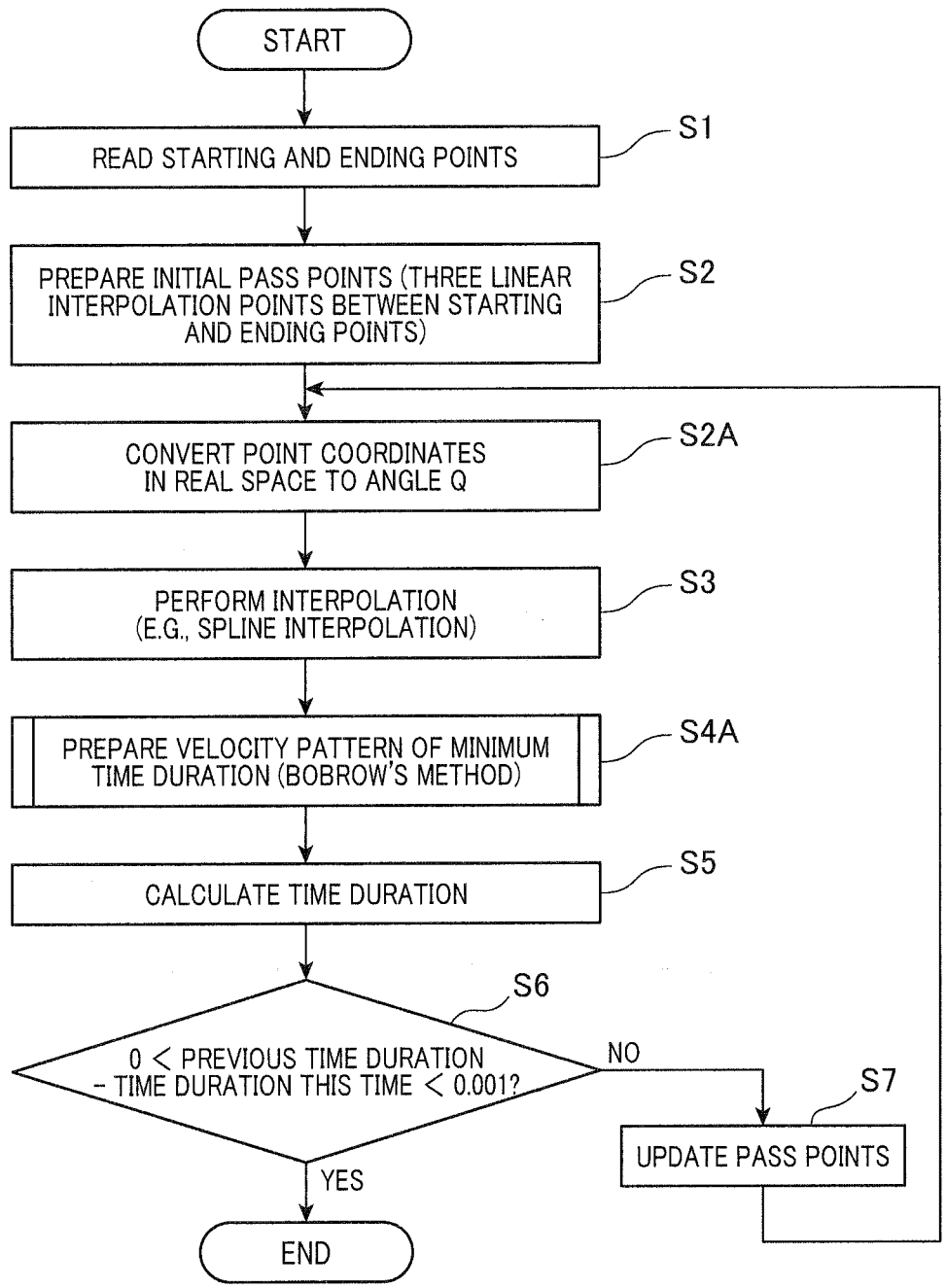
FIG. 12 shows a flow diagram illustrating a process of preparing a velocity pattern, which is performed by a control unit, according to a second embodiment of the present invention.
Figure 13:
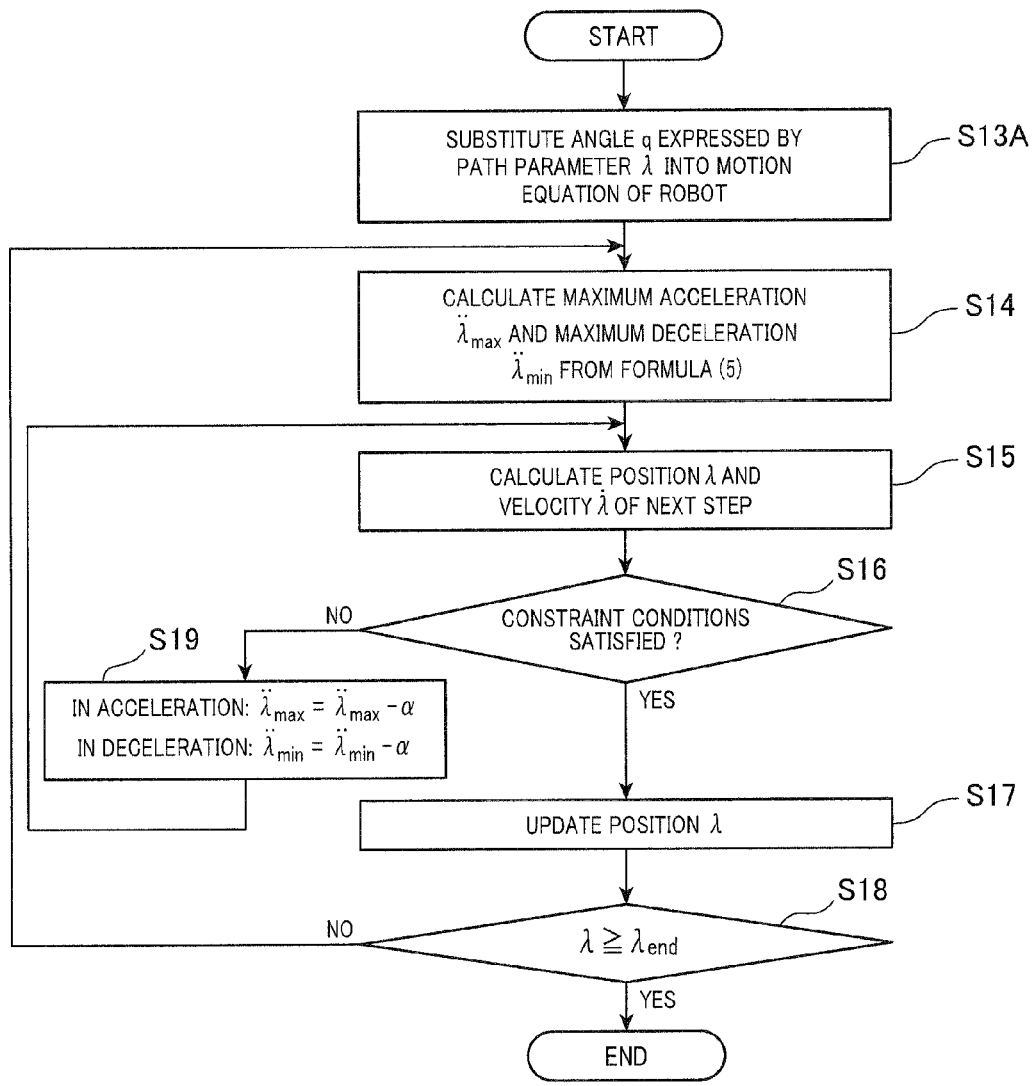
FIG. 13 shows a flow diagram illustrating a detailed process of preparing a velocity pattern according to the Bobrow's method, taking account of constraint conditions, the process being performed as a part of the process shown in FIG. 12.

Referring to FIGS. 12 and 13, hereinafter is described a second embodiment related to a method of generating a path of a multiaxial robot and a control apparatus for the multiaxial robot.

In the second and the subsequent embodiments, the components identical with or similar to those in the control apparatus of the first embodiment are given the same reference numerals for the sake of omitting or simplifying explanation.

In the method of generating a path of a multiaxial robot and a control apparatus for the multiaxial robot according to the second embodiment, there is a change in the timing of performing the step of converting the position x of an end effector to the angle q of each axis. Specifically, in the first embodiment described above, the position x of the end effector is converted to the angle q of each axis by solving the inverse kinematics (refer to step S12). In this regard, in the second embodiment, conversion to the angle q is performed at a stage prior to the preparation of a shortest velocity pattern, that is, at the stage of interpolating pass points. Thus, the calculation based on inverse kinematics can be omitted to dramatically reduce the load of calculation.

Referring to FIGS. 12 and 13, hereinafter is described a process of preparing a velocity pattern, which is performed by the control unit 9.

The control unit 9 reads information showing a start point and an end point given for example by an operator (step S1 in FIG. 12) and generates three initial pass points (step S2). Then the control unit 9 converts the start, end and initial pass points in the end effector space to corresponding angles in the joint space (step S2A). After this conversion, the control unit 9 proceeds to step S3 where the interpolation is performed for the start point, the end point and three initial pass points to produce a path $x=f(\lambda)$. In response, at step S4A, step S13A and steps S14 to S19 are performed as shown in FIG. 13. At step S13A among these steps, the angle q is substituted into the motion equation of robot.

In this case, the interpolated angle q is expressed by:

$$q=f(\lambda), q'=f'\lambda', q''=f'\lambda''+f''\lambda'^2 \qquad (17)$$

This is expressed by the motion equation of robot in a joint space as follows:

$$T=a_1(\lambda)\lambda''+a_2(\lambda)\lambda'^2+a_3(\lambda)\lambda'+a_4(\lambda)$$

$$a_1=Hf',$$

$$a_2=Hf''+h(q,f'),$$

$$a_3=Bf',$$

$$a_4=q \qquad (18)$$

In FIGS. 12 and 13, steps other than the above are similar to those of the first embodiment.

Thus, according to the second embodiment, the path x is converted to the joint angle q before the stage of interpolating the path $x=f(\lambda)$. This can eliminate the process of solving the equation of the inverse kinematics mentioned above, i.e. steps S11 and S12 of FIG. 6 described above. In other words, the motion dynamics (forward kinematics) only has to be solved in a joint angle space, leading to reduction of the load of calculation accordingly.

The operations and advantages obtained in the first embodiment can also be obtained in this second embodiment.

[Variations]

The present invention is not limited to the embodiment described above or illustrated in the drawings, but may be modified or extended as follows.

The number of the pass points may be four or more.

A method other than the Bobrow's method may be used in calculating a path of maximizing the velocity of the multiaxial robot, on the basis of the motion dynamics of the robot.

The base-side arm and the end effector-side arm are determined on the basis of the positional relationship of the arms. For example, a multiaxial robot may have a third arm connected to an end of a second arm. In this case, when the first arm is referred to as a "base-side arm", the second and the third arms are referred to as "end effector-side arms". Also, when the second arm is referred to as a "base-side arm", the third arm is referred to as an "end effector-side arm".

Figure 14:
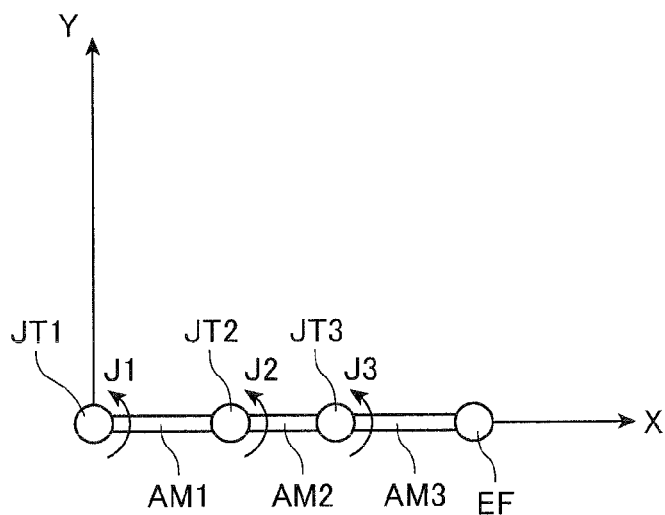
FIG. 14 shows a schematic diagram illustrating a triaxial arm robot according to a modification.

As an example of this, FIG. 14 shows a triaxial robot arm. This triaxial arm has arms AM1, AM2 and AM3 which are connected to joints JT1, JT2 and JT3, respectively. In moving the end effector EF of the triaxial arm from a start point to a desired end point as well, the method of generating a path and the control method described in the first or second embodiment can be similarly applied. In this case, when joint angles of the joints JT1, JT2 and JT3 are represented by $\theta_1$, $\theta_2$ and $\theta_3$, respectively, Formula (1) may be processed using the following angle q as a three-dimensional vector:

$$q=[\theta_1,\theta_2,\theta_3] \qquad (19)$$

Figure 15:
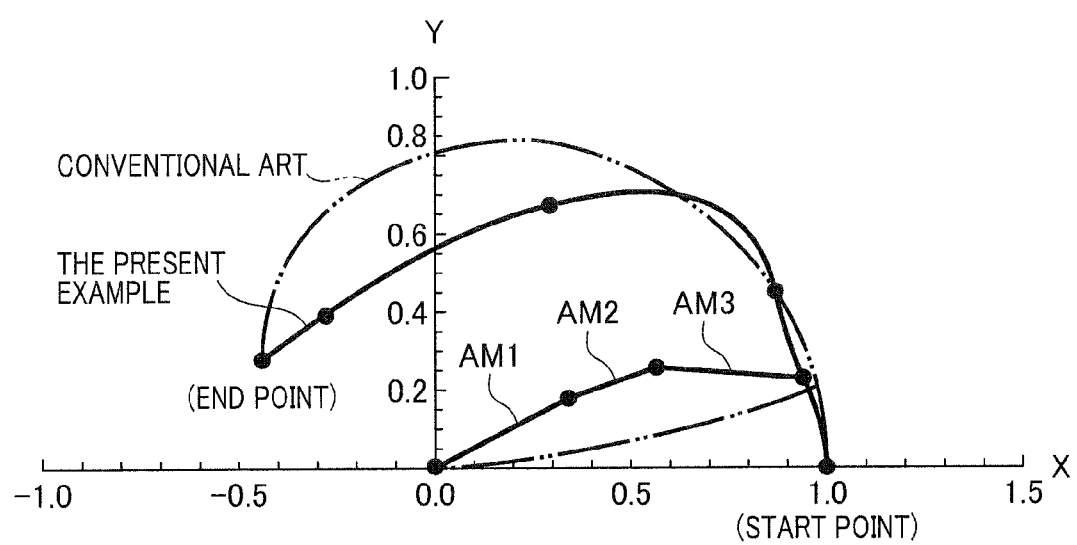
FIG. 15 shows a diagram illustrating a simulation when the method of generating a path of the present invention is applied to the triaxial robot.

As a result, the triaxial robot arm was activated as indicated in an example shown in FIG. 15. According to this, in moving the positions of the three axes (J1, J2 and J3) from a start point of (0, 0, 0) degree to an end point of (90, 45, 90) degree, an effect of enhancing the acceleration force and the deceleration force was confirmed to be obtained by the reaction of the end effector-side arm. In other words, compared to the locus of a path (the dash-dot-dot line in FIG. 15) of conventional art, the time duration was confirmed to be shortened.

The application of the present invention is not limited to a multiaxial robot that includes a travelling axis which is combined with a rotation axis. Instead, the present invention may be applied to a multiaxial robot having a different combination of axes.

In the embodiments described above, the upper limits $\lambda'_{min}$ and $\lambda'_{max}$ of the velocity of the constraint conditions are treated as being constant. However, these values may be variable values. Two examples of this are provided herein.

Figure 16:
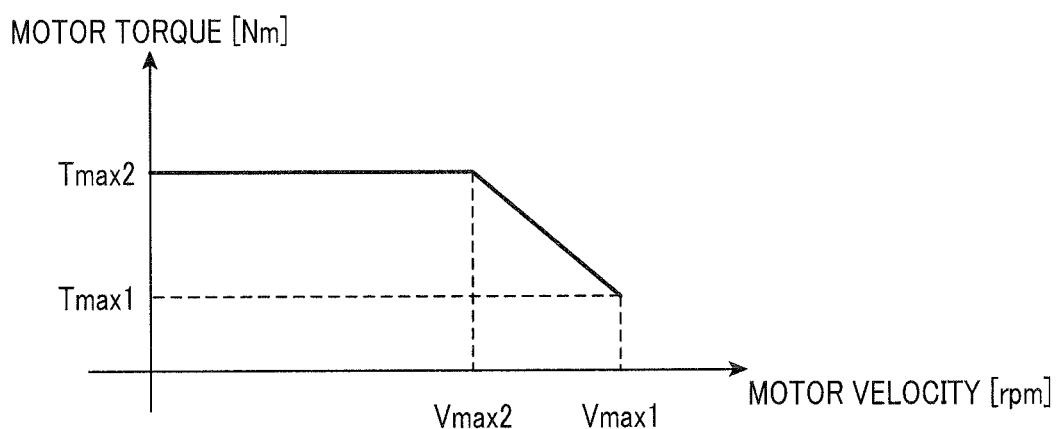
FIG. 16 shows a diagram illustrating a TN curve of a motor used in a multiaxial robot, according to another modification.

In the first example, focus is put on the relationship between velocity and torque of each motor of the robot of the present invention. Specifically, the first example relates to a function of varying the upper limit of the acceleration as one of the constraint conditions. FIG. 16 is a diagram illustrating a TN curve of a generally known motor. It is known that, as a motor increases its velocity, the outputted maximum torque decreases. Therefore, in this example, the constraint condition of the motor related to torque is expressed as follows, considering the above relationship:

$$\lambda''_{min}(\lambda, q'f) \leq \lambda''(\lambda, q'f) \leq \lambda''_{max}(\lambda, q'f) \quad (20)$$

Using the TN curve shown in FIG. 16, a maximum torque corresponding to the current velocity q' is calculated to make a determination based on Formula (20). Thus, maximum torque is varied according to velocity.

The second example relates to a function of varying an upper-limit velocity as one of the constraint conditions in an XR robot that has a travelling axis such as of a ball screw.

Figure 17:
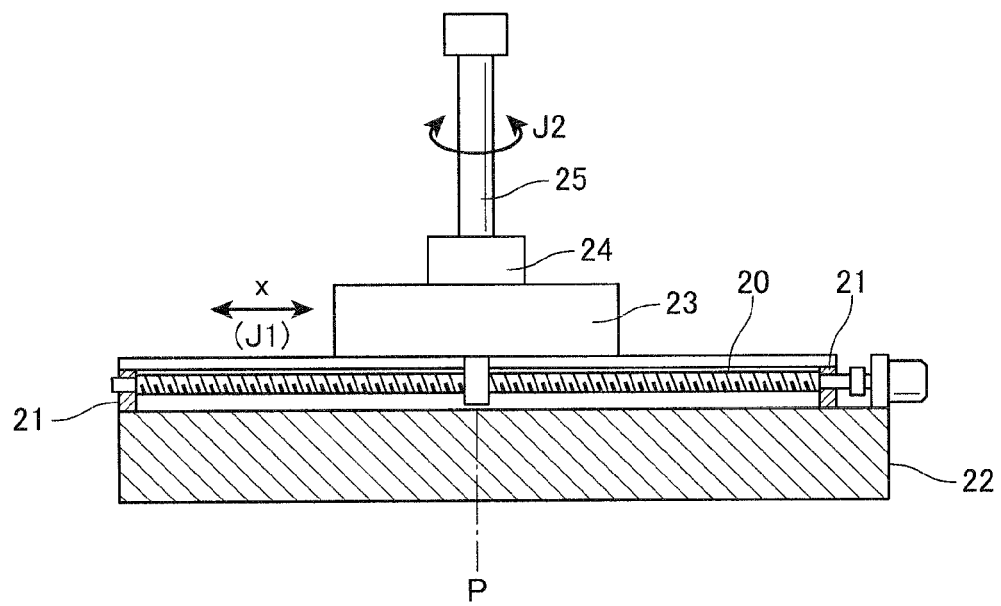
FIG. 17 shows a schematic diagram illustrating a biaxial XR robot, according to still another modification.

The XR robot shown in FIG. 17 includes a ball screw 20, a direct-acting axis J1 (X axis), a movable stage 23 and an arm 25. The direct-acting axis J1 has ends which are fixed to a fixed base 22 via a fixing means 21. The movable stage 23 is movably held by the direct-acting axis J1. The arm 25 is rotatably held by the movable stage 23 via a joint 24. The arm 25 serves as an axis of rotation (R axis) J2. The biaxial XR robot is configured in this way. In the generation of the path of the two axes J1 and J2, the configuration according to the present invention is implemented to thereby enhance the acceleration force and the deceleration force.

In a single axis such as of a ball screw, its upper-limit velocity (so-called limit velocity or critical velocity) is set up. The value of the upper-limit velocity however varies depending on the position of the axis from its fixed ends. When such a robot is driven with the conventional trapezoidal velocity pattern, the top edge (upper-limit velocity) of the trapezoid has been set to a constant value that is a value considering the safety factor.

Figure 18:
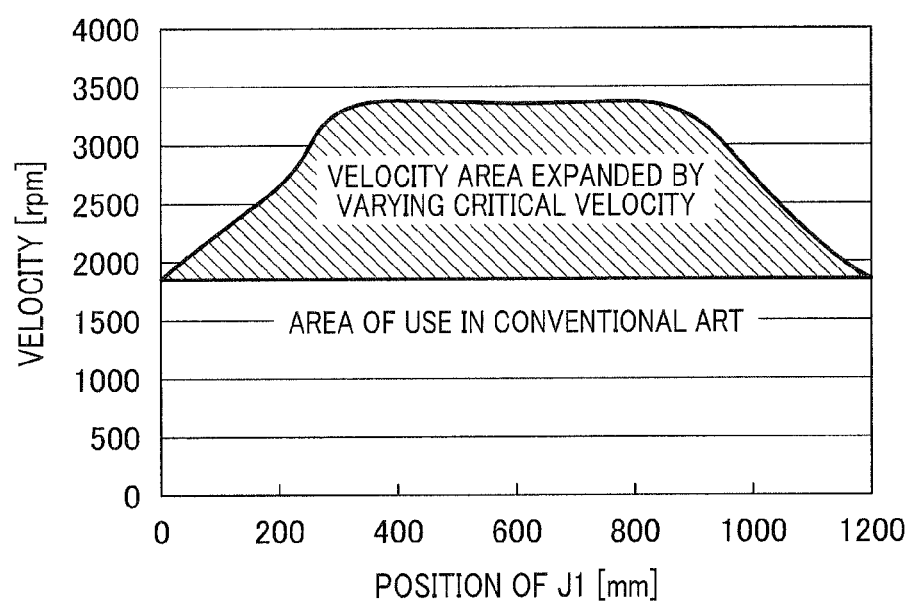
FIG. 18 shows a schematic diagram illustrating the effects of the method of generating a path of the present invention in the XR robot.

In this example, the method of generating a path according to the present invention can be applied to the XR robot to change the upper-limit velocity according to a position P of the movable stage 23 along the direct-acting axis J1. As will be understood from Formula (13), the constraint condition $\lambda'_{min} \leq \lambda' \leq \lambda'_{max}$ of velocity is determined by the position $\lambda$ (i.e. angle) and the maximum velocity q'. Therefore, the upper-limit velocity can be varied according to the position P on the axis J1. Thus, as schematically indicated by the hatched area in FIG. 18, the velocity area that has not been fully used in the conventional art can be efficiently used to further shorten the time duration.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A method of controlling drive of a multiaxial robot having a plurality of movable axes configured by a plurality of links and a plurality of joints, an end effector being arranged at an extreme end of the plurality of links, the method comprising steps of:
    specifying positions, in a control unit, of a start point of a path and an end point of the path in a three-dimensional space in which the plurality of movable axes are allowed to move three-dimensionally, the end effector being made to move on the path from the start point to the end point when the movable axes are actually driven; and
    generating, joint by joint, velocity patterns of first and second joints to drive respectively first and second joints among the plurality of joints on the basis of the specified positions of the start and end points, the second link being positioned closer to the end effector than the first link, the velocity patterns enabling the second link to move to cause i) a reaction for increasing an acceleration force generated by the first joint when the end effector is started to move from the start point toward the end point, and ii) a reaction for increasing a deceleration force generated by the first joint when the end effector is stopping to the end point,
    wherein, the velocity pattern for the first joint includes an accelerated-movement pattern range provided when the end effector is started to move from the start point, a decelerated-movement pattern range provided when the end effector is stopping to the end point, and a uniform movement pattern range intervening between the accelerated-movement and decelerated-movement pattern ranges; and
    wherein in order to cause the reaction, the second link is moved in a direction which is opposite to a direction in which the first joint is moved; and
    controlling drive of the first and second joints on the basis of the velocity pattern.

2. The method of according to claim 1, wherein the velocity pattern generating step includes a step of calculating the velocity pattern, taking account of constraint conditions in actuating the first and second joints.

3. The method of to claim 2, wherein the constraint conditions include an acceleration condition comprised of a maximum acceleration and a maximum deceleration of each of the first and second joints, and a velocity condition comprised of a maximum velocity and a minimum velocity of each of the first and second joints.

4. The method according to claim 2, comprising steps of:
    setting a plurality of initial pass points between the specified start point and the end point,
    wherein the velocity pattern generating step generates the velocity pattern of a shortest time, while updating positions of the initial pass points.

5. The method according to claim 4, wherein the plurality of initial pass points are three in number.

6. A control apparatus that controls a multiaxial robot having a plurality of movable axes configured by a plurality of links and a plurality of joints, comprising:
- means for specifying positions of a start point of a path and an end point of the path in a three-dimensional space in which the plurality of movable axes are allowed to move three-dimensionally, an end effector arranged at an extreme end of the plurality of links being made to move on the path from the start point to the end point when the movable axes are actually driven;
- means for generating, joint by joint, velocity patterns of first and second joints to drive respectively first and second joints among the plurality of joints on the basis of the specified positions of the start and end points, the second link being positioned closer to the end effector than the first link, the velocity patterns enabling the second link to move to cause i) a reaction for increasing an acceleration force generated by the first joint when the end effector is started to be moved from the start point toward the end point, and ii) a reaction for increasing a deceleration force generated by the first joint when the end effector is stopping to the end point;
- wherein, the velocity pattern for the first joint includes an accelerated-movement pattern range provided when the end effector is started to move from the start point, a decelerated-movement pattern range provided when the end effector is stopping to the end point, and a uniform movement pattern range intervening between the accelerated-movement and decelerated-movement pattern ranges, and
- wherein, in order to cause the reaction, the second link is moved in a direction which is opposite to a direction in which the first joint is moved; and
- a control means for controlling drive the first and second joints on the basis of the velocity pattern.

7. A control apparatus that controls a multiaxial robot having a plurality of movable axes configured by a plurality of links and a plurality of joints, comprising:
- a device that specifies positions of a start point of a path and an end point of the path in a three-dimensional space in which the plurality of movable axes are allowed to move three-dimensionally, an end effector arranged at an extreme end of the plurality of links being made to move on the path from the start point to the end point when the movable axes are actually driven; and
- a control unit that
  - generates, joint by joint, velocity patterns of first and second joints to drive respectively first and second joints among the plurality of joints on the basis of the specified positions of the start and end points, the second link being positioned closer to the end effector than the first link, the velocity patterns enabling the second link to move to cause i) a reaction for increasing an acceleration force generated by the first joint when the end effector is started to be moved from the start point toward the end point, and ii) a reaction for increasing a deceleration force generated by the first joint when the end effector is stopping to the end point,
    - wherein, the velocity pattern for the first joint includes an accelerated-movement pattern range provided when the end effector is started to move from the start point, a decelerated-movement pattern range provided when the end effector is stopping to the end point, and a uniform movement pattern range intervening between the accelerated-movement and decelerated-movement pattern ranges, and
    - wherein, in order to cause the reaction, the second link is moved in a direction which is opposite to a direction in which the first joint is moved; and
  - controls drive of the first and second joints on the basis of the velocity pattern.

\* \* \* \* \*